US012764753B2

(12) United States Patent
Zhang et al.

(10) Patent No.: US 12,764,753 B2
(45) Date of Patent: Oct. 13, 2026

(54) TRANSMISSION DETERMINATION METHOD AND DEVICE, BASE STATION, TERMINAL, AND COMPUTER-READABLE STORAGE MEDIUM

(71) Applicant: ZTE CORPORATION, Guangdong (CN)

(72) Inventors: Chenchen Zhang, Guangdong (CN); Peng Hao, Guangdong (CN); Xing Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 51 days.

(21) Appl. No.: 18/740,604

(22) Filed: Jun. 12, 2024

(65) Prior Publication Data

US 2024/0334443 A1 Oct. 3, 2024

Related U.S. Application Data

(63) Continuation of application No. 17/266,836, filed as application No. PCT/CN2019/100113 on Aug. 10, 2019, now Pat. No. 12,022,480.

(30) Foreign Application Priority Data

Aug. 10, 2018 (CN) ........................ 201810910223.X

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
CPC . H04W 72/23; H04W 72/56; H04W 72/0446; H04L 5/0053; H04L 1/08
See application file for complete search history.

(56) References Cited

U.S. PATENT DOCUMENTS

2012/0307755 A1* 12/2012 Kim ...................... H04L 1/1825 370/329
2017/0026942 A1* 1/2017 Vajapeyam ............. H04W 4/70
(Continued)

FOREIGN PATENT DOCUMENTS

CN 104584661 4/2015
CN 107889230 4/2018
(Continued)

OTHER PUBLICATIONS

Huawei et al., "Discussion on UL multiplexing of URLLC and eMBB" 3GPP TSG RAN WGI Ad Hoc Meeting, R1-1800057, Jan. 26, 2018.

(Continued)

*Primary Examiner* — John D Blanton
(74) *Attorney, Agent, or Firm* — McDonald Hopkins LLC

(57) ABSTRACT

Provided are a transmission determination method, a transmission determination apparatus, a base station, a terminal, and a computer-readable storage medium. Whether to receive a first transmission is determined according to first information, and/or whether to send a second transmission is determined according to first information, so that the first transmission is received or the second transmission is sent at one time moment. It is ensured that a terminal and/or a base station transmit at most one transmission at one time moment, thus avoiding a time domain conflict caused by overlapping of time domain resources for a transmission scheduled by downlink control information (DCI) and a transmission configured by higher-layer signaling.

6 Claims, 6 Drawing Sheets

(56) References Cited

U.S. PATENT DOCUMENTS

| | | | | |
|---|---|---|---|---|
| 2017/0303215 | A1* | 10/2017 | Kim | H04W 52/48 |
| 2017/0367069 | A1* | 12/2017 | Agiwal | H04B 7/088 |
| 2018/0007667 | A1* | 1/2018 | You | H04L 5/0051 |
| 2018/0027559 | A1 | 1/2018 | Iyer et al. | |
| 2018/0035459 | A1* | 2/2018 | Islam | H04L 1/16 |
| 2018/0132264 | A1 | 5/2018 | Jung et al. | |
| 2019/0305918 | A1* | 10/2019 | Siomina | H04L 5/0053 |
| 2019/0306828 | A1* | 10/2019 | Kim | H04W 72/046 |
| 2019/0349885 | A1* | 11/2019 | Koskela | H04W 68/005 |
| 2019/0373577 | A1* | 12/2019 | Agiwal | H04W 56/001 |
| 2019/0394749 | A1* | 12/2019 | Islam | H04B 7/088 |
| 2020/0221474 | A1* | 7/2020 | Lee | H04L 1/1896 |
| 2020/0280957 | A1* | 9/2020 | Gao | H04L 5/0053 |
| 2020/0295884 | A1* | 9/2020 | Bergström | H04L 1/189 |
| 2020/0296688 | A1* | 9/2020 | Islam | H04W 88/08 |
| 2020/0305120 | A1* | 9/2020 | Tang | H04W 68/00 |
| 2020/0349454 | A1* | 11/2020 | Hayashi | G06N 5/025 |
| 2020/0404616 | A1* | 12/2020 | Liu | H04W 52/0216 |
| 2020/0413367 | A1* | 12/2020 | Chen | H04W 52/0229 |
| 2021/0007076 | A1* | 1/2021 | Ljung | H04W 16/14 |
| 2021/0084615 | A1* | 3/2021 | Priyanto | H04W 68/06 |
| 2021/0127354 | A1* | 4/2021 | Rune | H04W 24/08 |
| 2021/0185652 | A1* | 6/2021 | Rune | H04L 5/0053 |
| 2021/0204244 | A1* | 7/2021 | Rune | H04W 68/005 |
| 2021/0243680 | A1* | 8/2021 | Harada | H04L 1/0045 |
| 2021/0314910 | A1* | 10/2021 | Rune | H04L 27/2607 |
| 2021/0352703 | A1* | 11/2021 | Zhang | H04L 1/08 |
| 2024/0147476 | A1* | 5/2024 | Zhang | H04W 72/20 |
| 2024/0334443 | A1* | 10/2024 | Zhang | H04L 5/003 |
| 2024/0364478 | A1* | 10/2024 | Wang | H04W 76/28 |

FOREIGN PATENT DOCUMENTS

| | | |
|---|---|---|
| CN | 108093480 | 5/2018 |
| CN | 108270514 | 7/2018 |
| CN | 108282879 | 7/2018 |
| CN | 108306720 | 7/2018 |
| KR | 10-2018-0034405 | 4/2018 |
| WO | 2018028696 | 2/2018 |

OTHER PUBLICATIONS

Patent Cooperation Treaty (PCT), International Search Report and Written Opinion for Application PCT/CN2019/100113 filed on Aug. 10, 2019, mailed Oct. 30, 2019, International Searching Authority, CN.

Zhang et al., "Seperation Algorithm to Multi-Component Signals Overlapped in Time Domain," College of Information Science and Technology, 2005. vol. 20, No. 2, China.

"Details of Signalling for TDD UL-DL Reconfiguration" 3GPP TSG RAN WG1 Meeting #74BIS, R1-134314, Oct. 11, 2013.

State Intellectual Property Office of People's Republic of China, Notification of First Office Action for Application No. 201810910223 report issue date Sep. 23, 2021, China.

State Intellectual Property Office of People's Republic of China, Notification of First Search Report for Application No. 201810910223, China.

Korean Patent Office, Notification of Office Action for Application No. 10-2021-7007333 issued Mar. 21, 2024.

* cited by examiner

TRANSMISSION DETERMINATION METHOD AND DEVICE, BASE STATION, TERMINAL, AND COMPUTER-READABLE STORAGE MEDIUM

CROSS-REFERENCE TO RELATED APPLICATIONS

This is a Continuation Applications of U.S. patent application Ser. No. 17/266,836 filed on Feb. 8, 2021 which is a U.S. National Stage Application of International Patent Application No. PCT/CN2019/100113, filed on Aug. 10, 2019, which claims priority to Chinese Patent Application No. 201810910223.X filed on Aug. 10, 2018, disclosures of which are incorporated herein by reference in their entireties.

TECHNICAL FIELD

The present disclosure relates to, but is not limited to, the technical field of communications and, in particular, relates to, but is not limited to, a transmission determination method, a transmission apparatus, a base station, a terminal, and a computer-readable storage medium.

BACKGROUND

At present, physical downlink control channel (PDCCH) downlink control information (DCI) can schedule a downlink/uplink transmission, and higher-layer signaling can configure an uplink/downlink transmission. However, when the time domain resources for the downlink/uplink transmission scheduled by the DCI overlap the time domain resources for the uplink/downlink transmission configured by the higher-layer signaling, a time domain conflict of transmission exists.

SUMMARY

A transmission determination method, a transmission apparatus, a base station, a terminal, and a computer-readable storage medium are provided in the embodiments of the present disclosure, which can solve the time domain conflict caused by overlapping of time domain resources for the transmission scheduled by DCI and the transmission configured by higher-layer signaling.

A transmission determination method is provided in the embodiments of the present disclosure. The method includes a step described below.

Whether to receive a first transmission is determined according to first information, and/or whether to send a second transmission is determined according to first information, so that the first transmission is received or the second transmission is sent at one time moment.

The first information includes at least one of the following pieces of information: whether time domain resources for the first transmission overlap time domain resources for the second transmission; a sequence relationship between a time domain starting resource for the first transmission and a time domain starting resource for the second transmission; first indication signaling; or a size of overlapping time domain resources for the first transmission and the second transmission.

The first transmission includes a transmission scheduled by DCI; and the second transmission includes a transmission configured by higher-layer signaling.

A transmission determination method is further provided in the embodiments of the present disclosure. The method includes a step described below.

Whether to send a first transmission is determined according to first information, and/or whether to receive a second transmission is determined according to first information, so that the first transmission is sent or the second transmission is received at one time moment.

The first information includes at least one of the following pieces of information: whether time domain resources for the first transmission overlap time domain resources for the second transmission; a sequence relationship between a time domain starting resource for the first transmission and a time domain starting resource for the second transmission; first indication signaling; or a size of overlapping time domain resources for the first transmission and the second transmission.

The first transmission includes a transmission scheduled by DCI; and the second transmission includes a transmission configured by higher-layer signaling.

A transmission determination apparatus is further provided in the embodiments of the present disclosure. The apparatus includes a first determination module.

The first determination module is configured to determine, according to first information, whether to receive a first transmission, and/or determine, according to first information, whether to send a second transmission, so that the first transmission is received or the second transmission is sent at one time moment.

The first information includes at least one of the following pieces of information: whether time domain resources for the first transmission overlap time domain resources for the second transmission; a sequence relationship between a time domain starting resource for the first transmission and a time domain starting resource for the second transmission; first indication signaling; or a size of overlapping time domain resources for the first transmission and the second transmission.

The first transmission includes a transmission scheduled by DCI; and the second transmission includes a transmission configured by higher-layer signaling.

A transmission determination apparatus is further provided in the embodiments of the present disclosure. The apparatus includes a second determination module.

The second determination module is configured to determine, according to first information, whether to send a first transmission, and/or determine, according to first information, whether to receive a second transmission, so that the first transmission is sent or the second transmission is received at one time moment.

The first information includes at least one of the following pieces of information: whether time domain resources for the first transmission overlap time domain resources for the second transmission; a sequence relationship between a time domain starting resource for the first transmission and a time domain starting resource for the second transmission; first indication signaling; or a size of overlapping time domain resources for the first transmission and the second transmission.

The first transmission includes a transmission scheduled by DCI; and the second transmission includes a transmission configured by higher-layer signaling.

A base station is further provided in the embodiments of the present disclosure. The base station includes a first processor, a first memory, and a first communication bus.

The first communication bus is configured to implement connection and communication between the first processor and the first memory.

The first processor is configured to execute one or more first programs stored in the first memory to implement steps of the preceding first transmission determination method; and/or the first processor is configured to execute one or more second programs stored in the first memory to implement the preceding second transmission determination method.

A terminal is further provided in the embodiments of the present disclosure. The terminal includes a second processor, a second memory, and a second communication bus.

The second communication bus is configured to implement connection and communication between the second processor and the second memory.

The second processor is configured to execute one or more third programs stored in the second memory to implement steps of the preceding first transmission determination method; and/or the second processor is configured to execute one or more fourth programs stored in the second memory to implement the preceding second transmission determination method.

A computer-readable storage medium is further provided in the embodiments of the present disclosure. The computer-readable storage medium stores one or more computer programs executable by one or more processors to implement steps of the first transmission determination method and/or implement steps of the second transmission determination method.

According to the transmission determination method and apparatus, the base station, the terminal, and the computer-readable storage medium provided in the embodiments of the present disclosure, whether to receive a first transmission is determined according to first information, and/or whether to send a second transmission is determined according to first information, so that the first transmission is received or the second transmission is sent at one time moment; whether to send a first transmission is determined according to first information, and/or whether to receive a second transmission is determined according to first information, so that the first transmission is sent or the second transmission is received at one time moment (where the first information includes at least one of the following pieces of information: whether time domain resources for the first transmission overlap time domain resources for the second transmission, a sequence relationship between a time domain starting resource for the first transmission and a time domain starting resource for the second transmission, first indication signaling, or a size of overlapping time domain resources for the first transmission and the second transmission; the first transmission includes a transmission scheduled by DCI, and the second transmission includes a transmission configured by higher-layer signaling). In this manner, it is ensured that a terminal and/or a base station transmit at most one transmission at one time moment, avoiding the time domain conflict caused by overlapping of time domain resources for a transmission scheduled by DCI and a transmission configured by higher-layer signaling, and thus avoiding the problem of not knowing which transmission to transmit.

DETAILED DESCRIPTION

Embodiments of the present disclosure will be described more detailedly with reference to the drawings. However, the concept of the present disclosure may be embodied in many different forms, and should not be construed as being limited to the embodiments illustrated herein. On the contrary, these embodiments are provided to make the present disclosure thorough and complete and fully convey the concept scope of the present disclosure to those skilled in the art. Throughout the preceding description and the drawings, the same reference numbers and numerals represent the same or similar elements.

It is to be understood that although the terms first, second, and the like may be used herein to describe elements or operations, these elements or operations should not be limited by these terms. These terms are only used to distinguish one element or operation from another. For example, a first transmission may be referred to as a second transmission, and similarly, the second transmission may be referred to as the first transmission, without departing from the teachings of the present disclosure.

The terms used herein are for describing particular embodiments and not intended to limit the concept of the present disclosure. As used herein, a singular form "a", "an", and "the" is intended to include a plural form, unless otherwise clearly indicated in the context. It is to be further understood that the term "including" or "comprising" used in the specification specifies the existence of the described features, regions, parts, steps, operations, elements, and/or components, without excluding the existence or addition of one or more other features, regions, parts, steps, operations, elements, components, and/or combinations thereof.

Unless otherwise defined, all the terms (including technical and scientific terms) used herein have the same meanings as those commonly understood by those skilled in the art to which the present disclosure pertains. It is to be further understood that terms, such as those defined in commonly used dictionaries, should be interpreted as having meanings consistent with their meanings in the context of the related art and/or the present disclosure, and will not be interpreted in an idealized or overly formal sense unless expressly so defined herein.

The embodiments of the present disclosure are further described below in detail with reference to the drawings and embodiments.

Embodiment One

Figure 1:
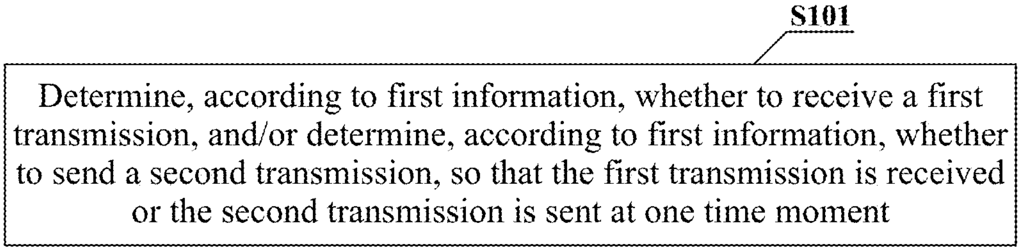
FIG. 1 is a flowchart of a transmission determination method according to embodiment one of the present disclosure.

FIG. 1 is a transmission determination method according to embodiment one of the present disclosure. As shown in FIG. 1, the transmission determination method includes a step described below.

S101: whether to receive a first transmission is determined according to first information, and/or whether to send a second transmission is determined according to first information, so that the first transmission is received or the second transmission is sent at one time moment.

It is to be noted that the first information in the embodiment includes at least one of the following pieces of information:

- whether time domain resources for the first transmission overlap time domain resources for the second transmission;
- a sequence relationship between a time domain starting resource for the first transmission and a time domain starting resource for the second transmission;
- first indication signaling; or
- a size of overlapping time domain resources for the first transmission and the second transmission.

It is to be noted that the first transmission in the embodiment includes a transmission scheduled by DCI, and the second transmission includes a transmission configured by higher-layer signaling. Specifically, the first transmission may be a transmission scheduled by DCI, and the second transmission may be a transmission configured by higher-layer signaling.

It is to be further noted that the transmission in the embodiment may be an uplink channel or signal transmission or a downlink channel or signal transmission.

It is to be understood that corresponding time domain resources are configured for a transmission to ensure that the transmission can be sent or received on the corresponding time domain resources.

However, it is to be noted that receiving the first transmission in the embodiment includes receiving the first transmission on part of the time domain resources for the first transmission or receiving the first transmission on all of the time domain resources for the first transmission. That is, the first transmission may be received on all of the time domain resources allocated to the first transmission, or the first transmission may be received on a certain part of the time domain resources allocated to the first transmission. If the first transmission is received on the certain part of the time domain resources, the unavailable time domain resources need to be subjected to rate matching when the first transmission is received.

Similarly, sending the second transmission in the embodiment includes sending the second transmission on part of the time domain resources for the second transmission or sending the second transmission on all of the time domain resources for the second transmission. That is, the second transmission may be sent on all of the time domain resources allocated to the second transmission, or the second transmission may be sent on a certain part of the time domain resources allocated to the second transmission. If the second transmission is sent on the certain part of the time domain resources, the unavailable time domain resources need to be subjected to rate matching when the second transmission is sent.

It is to be noted that, in the embodiment, both, one, or neither of the time domain starting resource for the first transmission and the time domain starting resource for the second transmission may fall within a first time period.

It is to be noted that the first time period in the embodiment is a time period with a duration of t starting from an end time of downlink control information scheduling the first transmission. In an implementation of the embodiment, the first time period may be the processing delay of sending an uplink channel or signal.

Figure 3:
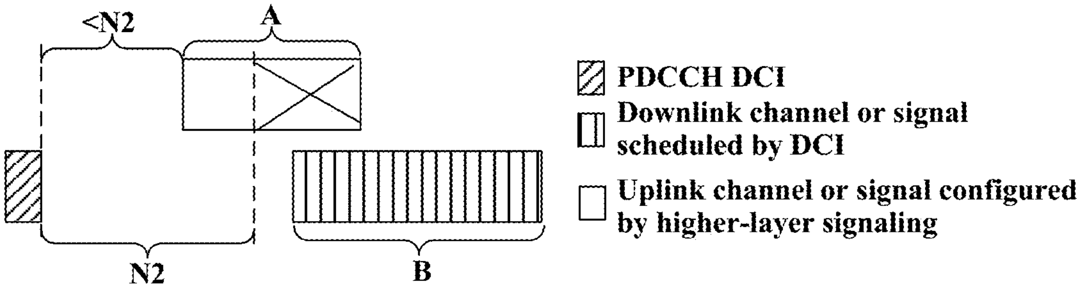
FIG. 3 is a schematic diagram of a transmission time domain according to embodiment three of the present disclosure.
Figure 5:
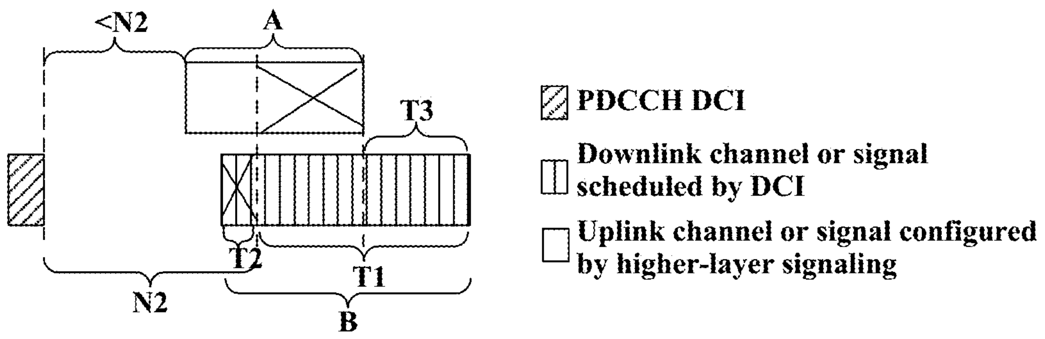
FIG. 5 is a schematic diagram of a transmission time domain according to embodiment five of the present disclosure.

For example, as shown in FIG. 3, the first time period is processing delay N2, the time domain starting resource for the first transmission represented by a vertical line shadow box is outside the first time period, and the time domain starting resource for the second transmission corresponding to a white box is within the first time period. For example, as shown in FIG. 5, the first time period is processing delay N2, and the time domain starting resource for the first transmission represented by a vertical line shadow box and the time domain starting resource for the second transmission corresponding to a white box are both within the first time period.

In the embodiment, a first threshold may also be predefined by a system or semi-statically configured for a terminal by a base station. In this manner, in a case where the first information includes the size of the overlapping time domain resources for the first transmission and the second transmission, it is determined to receive the first transmission when all or part of the overlapping time domain resources for the first transmission and the second transmission are less than or equal to the first threshold, or it is determined not to receive the first transmission when all or part of the overlapping time domain resources for the first transmission and the second transmission are greater than the first threshold.

It is to be noted that the step in which it is determined to receive the first transmission when part of the overlapping time domain resources for the first transmission and the second transmission are less than or equal to the first threshold, or it is determined not to receive the first transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to receive the first transmission when the one portion that falls within the first time period is less than or equal to the first threshold, or it is determined not to receive the first transmission when the one portion that falls within the first time period is greater than the first threshold; or the other portion that falls outside the first time period is compared with the first threshold, and it is determined to receive the first transmission when the other portion that falls outside the first time period is less than or equal to the first threshold, or it is determined not to receive the first transmission when the other portion that falls outside the first time period is greater than the first threshold.

Similarly, for the second transmission in the embodiment, a second threshold may also be predefined by the system or semi-statically configured for the terminal by the base station. In this manner, in a case where the first information includes the size of the overlapping time domain resources for the first transmission and the second transmission, it is determined to send the second transmission when all or part of the overlapping time domain resources for the first transmission and the second transmission are less than or equal to the second threshold, or it is determined not to send the second transmission when all or part of the overlapping time domain resources for the second transmission and the second transmission are greater than the first threshold.

It is to be noted that the step in which it is determined to send the second transmission when part of the overlapping time domain resources for the first transmission and the second transmission are less than or equal to the first threshold, or it is determined not to send the second transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to send the second transmission when the one portion that falls within the first time period is less than or equal to the first threshold, or it is determined not to send the second transmission when the one portion that falls within the first time period is greater than the first threshold; or the other portion that falls outside the first time period is compared with the first threshold, and it is determined to send the second transmission when the other portion that falls outside the first time period is less than or equal to the first threshold, or it is determined not to send the second transmission when the other portion that falls outside the first time period is greater than the first threshold.

It is to be noted that the first threshold and the second threshold configured in the embodiment may be the same or different. Specially, when the configured first threshold and the configured second threshold are the same, only one threshold may be required in the terminal and/or the base station to represent both the first threshold and the second threshold.

It is specially to be noted that in the embodiment, when it is determined, according to the first information, to receive the first transmission, if the first transmission is received on part of the time domain resources for the first transmission, rate matching may also be performed on the part of the time domain resources for the first transmission that are not used for receiving the first transmission when the first transmission is received.

Similarly, in the embodiment, when it is determined, according to the first information, to send the second transmission, if the second transmission is sent on part of the time domain resources for the second transmission, rate matching may also be performed on the part of the time domain resources for the second transmission that are not used for sending the second transmission when the second transmission is sent.

In the embodiment, in a case where the first information includes whether the time domain resources for the first transmission overlap the time domain resources for the second transmission and the sequence relationship between the time domain starting resource for the first transmission and the time domain starting resource for the second transmission, in response to the time domain resources for the first transmission overlapping the time domain resources for the second transmission, and in response to the time domain starting resource for the first transmission being before the time domain starting resource for the second transmission within a first time period, the first transmission may be received on the time domain resources for the first transmission, and the sending of the second transmission on part or all of the time domain resources for the second transmission is canceled.

In the embodiment, in a case where the first information includes whether the time domain resources for the first transmission overlap the time domain resources for the second transmission, the step of determining, according to the first information, whether to receive the first transmission, and determining, according to the first information, whether to send the second transmission may be as described below.

In response to the time domain resources for the first transmission overlapping the time domain resources for the second transmission after the first time period, the second transmission is sent on part of the time domain resources for the second transmission before the time domain starting resource for the first transmission, and the first transmission is received on all of the time domain resources corresponding to the first transmission.

In the embodiment, in a case where the first information includes whether the time domain resources for the first transmission overlap the time domain resources for the second transmission, the step of determining, according to the first information, whether to receive the first transmission may be as described below.

In response to the time domain resources for the first transmission overlapping the time domain resources for the second transmission, and in a case where the time domain starting resource for the second transmission is earlier than the time domain starting resource for the first transmission, the first transmission is received on part of the time domain resources for the first transmission, or the first transmission is not received.

Specifically, the step of receiving the first transmission on the part of the time domain resources for the first transmission may be as described below.

The first transmission is received on time domain resources for the first transmission after the first time period. For example, as shown in FIG. 5, the first transmission may be received over the entire time period T1 after N2 (time domain resources for the second transmission after N2 are canceled correspondingly).

Figure 6:
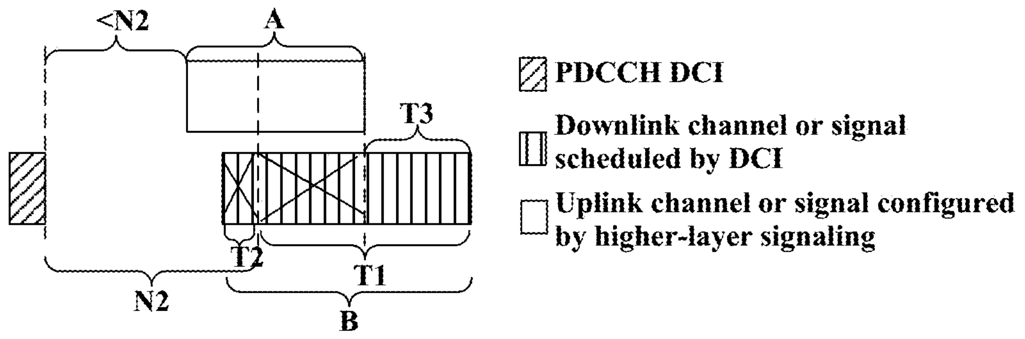
FIG. 6 is a schematic diagram of a transmission time domain according to embodiment one of the present disclosure.

Alternatively, the first transmission is received on time domain resources for the first transmission after an end of the time domain resources for the second transmission. For example, as shown in FIG. 6, the first transmission may be received over a time period T3 after N2 (correspondingly, time domain resources in T1 except T3 for the first transmission are canceled, and the time domain resources for the second transmission are not canceled).

In the embodiment, in response to the time domain resources for the first transmission overlapping the time domain resources for the second transmission, and in the case where the time domain starting resource for the second transmission is earlier than the time domain starting resource for the first transmission, it is may be specifically determined whether to receive the first transmission on the part of the time domain resources for the first transmission or not to receive the first transmission according to the number of symbols included in time domain resources for the first transmission after the first time period and/or a proportion of time domain resources for the first transmission after the first time period among all of the time domain resources corresponding to the first transmission.

Specifically, a number of symbols threshold and/or a proportion threshold is predefined by the system or semi-statically configured by the base station.

Thus, in a case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission is received on the part of the time domain resources for the first transmission. In a case where the number of symbols included in the time domain resources for the first transmission after the first time period is less than the number of symbols threshold, the first transmission is not received, and in a case where the proportion of the time domain resources for the first transmission after the first time period among the all of the time domain resources for the first transmission is less than the proportion threshold, the first transmission is not received.

For example, receiving the first transmission on the part of the time domain resources for the first transmission is receiving the first transmission on time domain resources for the first transmission after the first time period; then, in the case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission may be received on the time domain resources for the first transmission after the first time period, and otherwise, the first transmission is not received.

In an implementation of the embodiment, in a case where the first information includes whether the time domain resources for the first transmission overlap the time domain resources for the second transmission, the step of determining, according to the first information, whether to send the second transmission may be as follows: in response to the time domain resources for the first transmission overlapping the time domain resources for the second transmission, and in a case where the time domain starting resource for the first transmission is before the time domain starting resource for the second transmission, the second transmission is sent on part of the time domain resources for the second transmission, or the second transmission is not sent.

In an implementation of the embodiment, in a case where the first information includes whether the time domain resources for the first transmission overlap the time domain resources for the second transmission, the step of determining, according to the first information, whether to receive the first transmission may be as follows: in response to the time domain resources for the first transmission overlapping the time domain resources for the second transmission, and in a case where the time domain starting resource for the first transmission is before the time domain starting resource for the second transmission, the first transmission is received on part of the time domain resources for the first transmission, or the first transmission is not received.

Receiving the first transmission on part of the time domain resources for the first transmission may specifically be receiving the first transmission on part of the time domain resources for the first transmission after the first time period.

In the embodiment, the first indication signaling is signaling scheduling the first transmission and/or semi-static configuration signaling.

In a case where the first indication signaling is the signaling scheduling the first transmission, whether to receive the first transmission is determined according to the first indication signaling in at least one of the included manners described below.

1. Whether to receive the first transmission is determined according to a priority indication domain in the first indication signaling.

In the embodiment, a "priority indication" field may be added to the PDCCH DCI and indicates whether a channel or signal currently scheduled by the DCI can be canceled. If the domain indicates "Yes", the channel or signal currently scheduled by the DCI can be canceled; if the domain indicates "No", the channel or signal currently scheduled by the DCI cannot be canceled.

2. Whether to receive the first transmission is determined according to a DCI format type for sending the first indication signaling.

In the embodiment, a DCI format type corresponding to the PDCCH DCI may be used for indication. If the corresponding DCI format type corresponds to high-priority traffic, the channel or signal currently scheduled by the DCI cannot be canceled; if the corresponding DCI format type does not correspond to high-priority traffic, the channel or signal currently scheduled by the DCI can be canceled. For example, high-priority traffic corresponds to compact DCI format or DCI format0_0 or DCI format1_0, and low-priority traffic corresponds to non-compact DCI format or DCI format0_1 or DCI format1_1.

3. Whether to receive the first transmission is determined according to a radio network temporary identifier (RNTI) type for blindly detecting the first indication signaling.

In the embodiment, a scrambling RNTI type corresponding to the PDCCH DCI may be used for indication. If a first RNTI type is used for scrambling a cyclic redundancy check (CRC) check bit of the PDCCH DCI, the channel or signal currently scheduled by the DCI cannot be canceled; if other RNTIs other than the first RNTI type are used for scrambling the CRC check bit of the PDCCH DCI, the channel or signal currently scheduled by the DCI can be canceled.

In a case where the first indication signaling is the semi-static configuration signaling, whether to receive the first transmission is determined according to the first indication signaling in at least one of the included manners described below.

1. Whether to receive the first transmission is determined according to a repetition factor indicated in the first indication signaling and a repetition serial number of a current first transmission.

In the embodiment, the repetition factor may be predefined by the system or semi-statically configured by the base station. The first indication signaling may specify that only the first transmission of a specific repetition serial number can be canceled. For example, if the repetition factor is 4, the current first transmission needs to be received 4 times, and then it may be set that one or several of these 4 times can be canceled. For example, the repetition factor is configured by higher-layer signaling to be m, the current first transmission is the n-th first transmission, and n is less than or equal to m, and then whether the n-th first transmission can be received is determined according to which of the m transmissions can be canceled and which cannot be canceled predefined by the system or semi-statically configured by the base station. It is to be noted that canceling the first transmission refers to canceling all of the time domain resources for the first transmission.

2. Whether to receive the first transmission is determined according to a first transmission redundancy version determined by the first indication signaling and a redundancy version (RV) used in a current first transmission.

In the embodiment, a RV number for each first transmission may be predefined by the system or semi-statically configured by the base station. The first indication signaling may specify that only the first transmission of a specific RV number can be canceled. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission can be canceled when RV is 2 and 4, so only the second and fourth first transmissions can be canceled among these four first transmissions. It is to be noted that canceling the first transmission refers to canceling all of the time domain resources for the first transmission.

The current first transmission is the n-th first transmission, n is less than or equal to m, and then whether the n-th first transmission can be received is determined according to which of the m transmissions can be canceled and which cannot be canceled predefined by the system or semi-statically configured by the base station.

In addition, in the embodiment, determining, according to the first indication signaling, whether to receive the first transmission may further be: determining, according to a rule predefined by the system, whether to receive the first transmission.

In the embodiment, whether to receive the first transmission is determined according to the rule predefined by the system in at least one of the included manners described below.

1. It is determined whether to receive the first transmission according to a repetition serial number of a current first transmission and a specific repetition serial number predefined by the system.

In the embodiment, the system may predefine or the base station may semi-statically configure the repetition factor and may also directly specify that only the first transmission of a specific repetition serial number can be received. Thus, when the repetition serial number of the current first transmission is the specific repetition serial number predefined by the system, the first transmission can be canceled; otherwise, the first transmission cannot be canceled. It is to be noted that canceling the first transmission refers to canceling all of the time domain resources for the first transmission.

2. Whether to receive the first transmission is determined according to a redundancy version of a current first transmission and a specific redundancy version predefined by the system.

In the embodiment, the system may predefine or the base station may semi-statically configure the RV and may also directly specify that only the first transmission of a specific RV is received. Thus, when the RV of the current first transmission is the RV predefined by the system, the first transmission can be canceled; otherwise, the first transmission cannot be canceled. It is to be noted that canceling the first transmission refers to canceling all of the time domain resources for the first transmission.

It is to be understood that in the embodiment, the corresponding transmission is canceled when the corresponding time domain resources are canceled. For example, when the time domain resources corresponding to the first transmission are canceled, the first transmission is not received; when the time domain resources corresponding to the second transmission are canceled, the second transmission is not sent.

According to the transmission determination method provided in the embodiments of the present disclosure, whether to receive a first transmission is determined according to first information, and/or whether to send a second transmission is determined according to first information, so that the first transmission is received or the second transmission is sent at one time moment; (where the first information includes at least one of the following pieces of information: whether time domain resources for the first transmission overlap time domain resources for the second transmission, a sequence relationship between a time domain starting resource for the first transmission and a time domain starting resource for the second transmission, first indication signaling, or a size of overlapping time domain resources for the first transmission and the second transmission; the first transmission includes a transmission scheduled by DCI, and the second transmission includes a transmission configured by higher-layer signaling). In this manner, it is ensured that a terminal and/or a base station transmit at most one transmission at one time moment, avoiding the time domain conflict caused by overlapping of time domain resources for a transmission scheduled by DCI and a transmission configured by higher-layer signaling, and thus avoiding the problem of not knowing which transmission to transmit.

Embodiment Two

Figure 2:
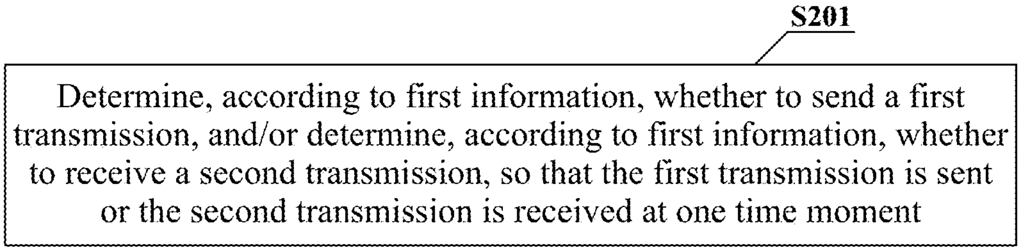
FIG. 2 is a flowchart of a transmission determination method according to embodiment two of the present disclosure.

FIG. 2 is a transmission determination method according to embodiment one of the present disclosure. As shown in FIG. 2, the transmission determination method includes a step described below.

S201: Whether to send a first transmission is determined according to first information, and/or whether to receive a second transmission is determined according to first information, so that the first transmission is sent or the second transmission is received at one time moment.

It is to be noted that the first information in the embodiment includes at least one of the following pieces of information:

- whether time domain resources for the first transmission overlap time domain resources for the second transmission;

a sequence relationship between a time domain starting resource for the first transmission and a time domain starting resource for the second transmission;

first indication signaling; or a size of overlapping time domain resources for the first transmission and the second transmission.

It is to be noted that the first transmission in the embodiment includes a transmission scheduled by DCI, and the second transmission includes a transmission configured by higher-layer signaling. Specifically, the first transmission may be a transmission scheduled by DCI, and the second transmission may be a transmission configured by higher-layer signaling.

It is to be further noted that the transmission in the embodiment may be an uplink channel or signal transmission or a downlink channel or signal transmission.

It is to be understood that corresponding time domain resources are configured for a transmission to ensure that the transmission can be sent or received on the corresponding time domain resources.

However, it is to be noted that sending the first transmission in the embodiment includes sending the first transmission on part of the time domain resources for the first transmission or sending the first transmission on all of the time domain resources for the first transmission. That is, the first transmission may be sent on all of the time domain resources allocated to the first transmission, or the first transmission may be sent on a certain part of the time domain resources allocated to the first transmission. If the first transmission is sent on the certain part of the time domain resources, the unavailable time domain resources need to be subjected to rate matching when the first transmission is sent.

Similarly, receiving the second transmission in the embodiment includes receiving the second transmission on part of the time domain resources for the second transmission or receiving the second transmission on all of the time domain resources for the second transmission. That is, the second transmission may be received on all of the time domain resources allocated to the second transmission, or the second transmission may be received on a certain part of the time domain resources allocated to the second transmission. If the second transmission is received on the certain part of the time domain resources, the unavailable time domain resources need to be subjected to rate matching when the second transmission is received.

It is to be noted that, in the embodiment, both, one, or neither of the time domain starting resource for the first transmission and the time domain starting resource for the second transmission may fall within a first time period.

It is to be noted that the first time period in the embodiment is a time period with a duration of t starting from an end time of downlink control information scheduling the first transmission. In an implementation of the embodiment, the first time period may be the processing delay of receiving an uplink channel or signal.

In the embodiment, a first threshold may also be predefined by a system or semi-statically configured for a terminal by a base station. In this manner, in a case where the first information includes the size of the overlapping time domain resources for the first transmission and the second transmission, it is determined to send the first transmission when all or part of the overlapping time domain resources for the first transmission and the second transmission are less than or equal to the first threshold, or it is determined not to send the first transmission when all or part of the overlapping time domain resources for the first transmission and the second transmission are greater than the first threshold.

It is to be noted that the step in which it is determined to send the first transmission when part of the overlapping time domain resources for the first transmission and the second transmission are less than or equal to the first threshold, or it is determined not to send the first transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to send the first transmission when the one portion that falls within the first time period is less than or equal to the first threshold, or it is determined not to send the first transmission when the one portion that falls within the first time period is greater than the first threshold; or the other portion that falls outside the first time period is compared with the first threshold, and it is determined to send the first transmission when the other portion that falls outside the first time period is less than or equal to the first threshold, or it is determined not to send the first transmission when the other portion that falls outside the first time period is greater than the first threshold.

Similarly, for the second transmission in the embodiment, a second threshold may also be predefined by the system or semi-statically configured for the terminal by the base station. In this manner, in a case where the first information includes the size of the overlapping time domain resources for the first transmission and the second transmission, it is determined to receive the second transmission when all or part of the overlapping time domain resources for the first transmission and the second transmission are less than or equal to the second threshold, or it is determined not to receive the second transmission when all or part of the overlapping time domain resources for the second transmission and the second transmission are greater than the first threshold.

It is to be noted that the step in which it is determined to receive the second transmission when part of the overlapping time domain resources for the first transmission and the second transmission are less than or equal to the first threshold, or it is determined not to receive the second transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to receive the second transmission when the one portion that falls within the first time period is less than or equal to the first threshold, or it is determined not to receive the second transmission when the one portion that falls within the first time period is greater than the first threshold; or the other portion that falls outside the first time period is compared with the first threshold, and it is determined to receive the second transmission when the other portion that falls outside the first time period is less than or equal to the first threshold, or it is determined not to receive the second transmission when the other portion that falls outside the first time period is greater than the first threshold.

It is to be noted that the first threshold and the second threshold configured in the embodiment may be the same or different. Specially, when the configured first threshold and the configured second threshold are the same, only one threshold may be required in the terminal and/or the base station to represent both the first threshold and the second threshold.

It is specially to be noted that in the embodiment, when it is determined, according to the first information, to send the first transmission, if the first transmission is sent on part of the time domain resources for the first transmission, rate matching may also be performed on the part of the time domain resources for the first transmission that are not used for sending the first transmission when the first transmission is sent.

Similarly, in the embodiment, when it is determined, according to the first information, to receive the second transmission, if the second transmission is received on part of the time domain resources for the second transmission, rate matching may also be performed on the part of the time domain resources for the second transmission that are not used for receiving the second transmission when the second transmission is received.

In the embodiment, in a case where the first information includes whether the time domain resources for the first transmission overlap the time domain resources for the second transmission and the sequence relationship between the time domain starting resource for the first transmission and the time domain starting resource for the second transmission, in response to the time domain resources for the first transmission overlapping the time domain resources for the second transmission, and in response to the time domain starting resource for the first transmission being before the time domain starting resource for the second transmission within a first time period, the first transmission may be sent on the time domain resources for the first transmission, and the reception of the second transmission on part or all of the time domain resources for the second transmission is canceled.

In the embodiment, in a case where the first information includes whether the time domain resources for the first transmission overlap the time domain resources for the second transmission, the step of determining, according to the first information, whether to send the first transmission, and determining, according to the first information, whether to receive the second transmission may be as described below.

In response to the time domain resources for the first transmission overlapping the time domain resources for the second transmission after the first time period, the second transmission is received on part of the time domain resources for the second transmission before the time domain starting resource for the first transmission, and the first transmission is sent on all of the time domain resources corresponding to the first transmission.

In the embodiment, in a case where the first information includes whether the time domain resources for the first transmission overlap the time domain resources for the second transmission, the step of determining, according to the first information, whether to send the first transmission may be as described below.

In response to the time domain resources for the first transmission overlapping the time domain resources for the second transmission, and in a case where the time domain starting resource for the second transmission is earlier than the time domain starting resource for the first transmission, the first transmission is sent on part of the time domain resources for the first transmission, or the first transmission is not sent.

Specifically, the step of sending the first transmission on the part of the time domain resources for the first transmission may be as described below.

The first transmission is sent on time domain resources for the first transmission after the first time period, or the first transmission is sent on time domain resources for the first transmission after an end of the time domain resources for the second transmission.

In the embodiment, in response to the time domain resources for the first transmission overlapping the time domain resources for the second transmission, and in the case where the time domain starting resource for the second transmission is earlier than the time domain starting resource for the first transmission, it is may be specifically determined whether to send the first transmission on the part of the time domain resources for the first transmission or not to send the first transmission according to the number of symbols included in time domain resources for the first transmission after the first time period and/or a proportion of time domain resources for the first transmission after the first time period among all of the time domain resources corresponding to the first transmission.

Specifically, a number of symbols threshold and/or a proportion threshold is predefined by the system or semi-statically configured by the base station.

Thus, in a case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission is sent on the part of the time domain resources for the first transmission. In a case where the number of symbols included in the time domain resources for the first transmission after the first time period is less than the number of symbols threshold, the first transmission is not received, and in a case where the proportion of the time domain resources for the first transmission after the first time period among the all of the time domain resources for the first transmission is less than the proportion threshold, the first transmission is not received.

For example, sending the first transmission on the part of the time domain resources for the first transmission is sending the first transmission on time domain resources for the first transmission after the first time period; then, in the case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission may be sent on the time domain resources for the first transmission after the first time period, and otherwise, the first transmission is not sent.

In an implementation of the embodiment, in a case where the first information includes whether the time domain resources for the first transmission overlap the time domain resources for the second transmission, the step of determining, according to the first information, whether to receive the second transmission may be as follows: in response to the time domain resources for the first transmission overlapping the time domain resources for the second transmission, and in a case where the time domain starting resource for the first transmission is before the time domain starting resource for the second transmission, the second transmission is received on part of the time domain resources for the second transmission, or the second transmission is not received.

In an implementation of the embodiment, in a case where the first information includes whether the time domain resources for the first transmission overlap the time domain resources for the second transmission, the step of determining, according to the first information, whether to send the first transmission may be as follows: in response to the time domain resources for the first transmission overlapping the time domain resources for the second transmission, and in a case where the time domain starting resource for the first transmission is before the time domain starting resource for the second transmission, the first transmission is sent on part of the time domain resources for the first transmission, or the first transmission is not sent.

Sending the first transmission on part of the time domain resources for the first transmission may specifically be sending the first transmission on part of the time domain resources for the first transmission after the first time period.

In the embodiment, the first indication signaling is signaling scheduling the first transmission and/or semi-static configuration signaling.

In a case where the first indication signaling is the signaling scheduling the first transmission, whether to send the first transmission is determined according to the first indication signaling in at least one of the included manners described below.

1. Whether to send the first transmission is determined according to a priority indication domain in the first indication signaling.

In the embodiment, a "priority indication" field may be added to the PDCCH DCI and indicates whether a channel or signal currently scheduled by the DCI can be canceled. If the domain indicates "Yes", the channel or signal currently scheduled by the DCI can be canceled; if the domain indicates "No", the channel or signal currently scheduled by the DCI cannot be canceled.

2. Whether to send the first transmission is determined according to a DCI format type for receiving the first indication signaling.

In the embodiment, a DCI format type corresponding to the PDCCH DCI may be used for indication. If the corresponding DCI format type corresponds to high-priority traffic, the channel or signal currently scheduled by the DCI cannot be canceled; if the corresponding DCI format type does not correspond to high-priority traffic, the channel or signal currently scheduled by the DCI can be canceled. For example, high-priority traffic corresponds to compact DCI format or DCI format0_0 or DCI format1_0, and low-priority traffic corresponds to non-compact DCI format or DCI format0_1 or DCI format1_1.

3. Whether to send the first transmission is determined according to an RNTI type for blindly detecting the first indication signaling.

In the embodiment, a scrambling RNTI type corresponding to the PDCCH DCI may be used for indication. If a first RNTI type is used for scrambling a cyclic redundancy check (CRC) check bit of the PDCCH DCI, the channel or signal currently scheduled by the DCI cannot be canceled; if other RNTIs other than the first RNTI type are used for scrambling the CRC check bit of the PDCCH DCI, the channel or signal currently scheduled by the DCI can be canceled.

In a case where the first indication signaling is the semi-static configuration signaling, whether to send the first transmission is determined according to the first indication signaling in at least one of the included manners described below.

1. Whether to send the first transmission is determined according to a repetition factor indicated in the first indication signaling and a repetition serial number of a current first transmission.

In the embodiment, the repetition factor may be predefined by the system or semi-statically configured by the base station. The first indication signaling may specify that only the first transmission of a specific repetition serial number can be canceled. For example, if the repetition factor is 4, the current first transmission needs to be sent 4 times, and then it may be set that one or several of these 4 times can be canceled. For example, the repetition factor is configured by higher-layer signaling to be m, the current first transmission is the n-th first transmission, and n is less than or equal to m, and then whether the n-th first transmission can be sent is determined according to which of the m transmissions can be canceled and which cannot be canceled predefined by the system or semi-statically configured by the base station. It is to be noted that canceling the first transmission refers to canceling all of the time domain resources for the first transmission.

2. Whether to send the first transmission is determined according to a first transmission redundancy version determined by the first indication signaling and a redundancy version (RV) used in a current first transmission.

In the embodiment, a RV number for each first transmission may be predefined by the system or semi-statically configured by the base station. The first indication signaling may specify that only the first transmission of a specific RV number can be canceled. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission can be canceled when RV is 2 and 4, so only the second and fourth first transmissions can be canceled among these four first transmissions. It is to be noted that canceling the first transmission refers to canceling all of the time domain resources for the first transmission.

The current first transmission is the n-th first transmission, n is less than or equal to m, and then whether the n-th first transmission can be sent is determined according to which of the m transmissions can be canceled and which cannot be canceled predefined by the system or semi-statically configured by the base station.

In addition, in the embodiment, determining, according to the first indication signaling, whether to send the first transmission may further be: determining, according to a rule predefined by the system, whether to send the first transmission.

In the embodiment, whether to send the first transmission is determined according to the rule predefined by the system in at least one of the included manners described below.

1. Whether to send the first transmission is determined according to a repetition serial number of a current first transmission and a specific repetition serial number predefined by the system.

In the embodiment, the system may predefine or the base station may semi-statically configure the repetition factor and may also directly specify that only the first transmission of a specific repetition serial number can be sent. Thus, when the repetition serial number of the current first transmission is the specific repetition serial number predefined by the system, the first transmission can be canceled; otherwise, the first transmission cannot be canceled. It is to be noted that canceling the first transmission refers to canceling all of the time domain resources for the first transmission.

2. Whether to send the first transmission is determined according to a redundancy version of a current first transmission and a specific redundancy version predefined by the system.

In the embodiment, the system may predefine or the base station may semi-statically configure the RV and may also directly specify that only the first transmission of a specific RV is sent. Thus, when the RV of the current first transmission is the RV predefined by the system, the first transmission can be canceled; otherwise, the first transmission cannot be canceled. It is to be noted that canceling the first transmission refers to canceling all of the time domain resources for the first transmission.

It is to be understood that in the embodiment, the corresponding transmission is canceled when the corresponding time domain resources are canceled. For example, when the time domain resources corresponding to the first transmission are canceled, the first transmission is not sent; when the time domain resources corresponding to the second transmission are canceled, the second transmission is not received.

According to the transmission determination method provided in the embodiments of the present disclosure, whether to send a first transmission is determined according to first information, and/or whether to receive a second transmission is determined according to first information, so that the first transmission is sent or the second transmission is received at one time moment; (where the first information includes at least one of the following pieces of information: whether time domain resources for the first transmission overlap time domain resources for the second transmission, a sequence relationship between a time domain starting resource for the first transmission and a time domain starting resource for the second transmission, first indication signaling, or a size of overlapping time domain resources for the first transmission and the second transmission; the first transmission includes a transmission scheduled by DCI, and the second transmission includes a transmission configured by higher-layer signaling). In this manner, it is ensured that a terminal and/or a base station transmit at most one transmission at one time moment, avoiding the time domain conflict caused by overlapping of time domain resources for a transmission scheduled by DCI and a transmission configured by higher-layer signaling, and thus avoiding the problem of not knowing which transmission to transmit.

Embodiment Three

In the embodiment, within time units where a semi-static frame structure configuration is Flexible or no semi-static frame structure configuration is received, a base station sends PDCCH DCI to instruct a terminal to receive a downlink channel or signal over B time units corresponding to the vertical line shadow box in FIG. 3. The base station instructs, through a higher-layer signaling configuration, the terminal to send an uplink channel or signal over A time units corresponding to a white box in FIG. 3.

N2 is the processing delay in preparation for an uplink transmission.

As can be seen from FIG. 3, the B time units for the terminal to receive the downlink channel or signal and the A time units for the terminal to send the uplink channel or signal overlap in the time domain, and the time domain position of the A time units is before the time domain position of the B time units.

The downlink channel or signal transmission indicated by the PDCCH DCI has a higher priority than the uplink channel or signal transmission configured by the higher-layer signaling. Therefore, the terminal cancels the sending of the uplink channel or signal over the time units with a cross among the A time units, that is, the terminal cancels the current transmission of the uplink channel or signal configured by the higher-layer signaling after delay N2 from the time when the scheduling of the PDCCH DCI is received. Then, for the transmission of the downlink channel or signal scheduled by the PDCCH DCI, the base station sends the transmission over the B time units according to the scheduling of the PDCCH DCI, and the terminal also receives the transmission of the downlink channel or signal over the B time units.

The base station sends a downlink channel or signal over the B time units according to scheduling of PDCCH DCI, and correspondingly, the terminal receives the downlink channel or signal scheduled by the PDCCH DCI and over the B time units.

Embodiment Four

Figure 4:
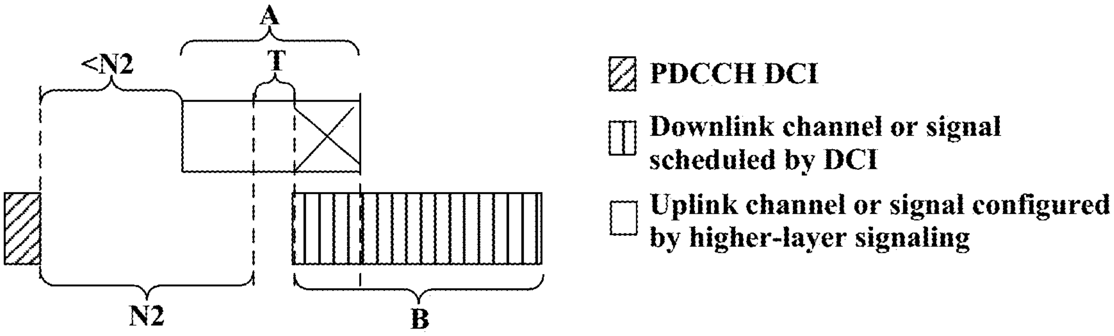
FIG. 4 is a schematic diagram of a transmission time domain according to embodiment four of the present disclosure.

Within time units where a semi-static frame structure configuration is Flexible or no semi-static frame structure configuration is received, a base station sends PDCCH DCI to instruct a terminal to receive a downlink channel or signal over B time units corresponding to the vertical line shadow box in FIG. 4. The base station instructs, through a higher-layer signaling configuration, the terminal to send an uplink channel or signal over A time units corresponding to a white box in FIG. 4.

N2 is the processing delay in preparation for an uplink transmission.

As can be seen from FIG. 4, the B time units for the terminal to receive the downlink channel or signal and the A time units for the terminal to send the uplink channel or signal overlap in the time domain, and the time domain starting position of the A time units is before the time domain starting position of the B time units.

The downlink channel or signal transmission indicated by the PDCCH DCI has a higher priority than the uplink channel or signal transmission configured by the higher-layer signaling. Therefore, on the basis of satisfying delay N2, within the overlapping time units of the A time units and the B time units, the terminal receives the downlink channel or signal sent by the base station and cancels the sending of the uplink channel or signal configured by the higher-layer signaling, that is, the terminal cancels the sending of the uplink channel or signal in the white part with a cross. However, the terminal does not cancel the sending of the uplink channel or signal within T time units. Although the T time units are already after delay N2 and can be canceled by the terminal, the terminal can still send the uplink channel or signal configured by the higher-layer signaling over the T time units since the terminal does not need to receive the downlink channel or signal during this period of time.

In the embodiment, when the downlink channel or signal scheduled by the PDCCH DCI and the uplink channel or signal configured by the higher-layer signaling overlap in the time domain, the terminal only cancels the sending of the uplink channel or signal configured by the higher-layer signaling in the overlapping part if the time domain overlapping occurs after delay N2 from the time when the terminal receives the PDCCH DCI.

The base station sends a downlink channel or signal over the B time units according to scheduling of PDCCH DCI, and correspondingly, the terminal receives the downlink channel or signal scheduled by the PDCCH DCI and over the B time units.

Embodiment Five

Within time units where a semi-static frame structure configuration is Flexible or no semi-static frame structure configuration is received, a base station sends PDCCH DCI to instruct a terminal to receive a downlink channel or signal over B time units corresponding to the shadow box in FIG. 5. The base station instructs, through a higher-layer signaling configuration, the terminal to send an uplink channel or signal over A time units corresponding to a white box in FIG. 5.

N2 is the processing delay in preparation for an uplink transmission.

As can be seen from FIG. 5, the B time units for the terminal to receive the downlink channel or signal and the A time units for the terminal to send the uplink channel or signal overlap in the time domain, and the time domain starting position of the A time units is before the time domain starting position of the B time units.

Within the delay N2 from the time when the terminal receives the PDCCH DCI, the terminal has no time to cancel the uplink channel or signal transmission configured by the higher-layer signaling, so the terminal sends the uplink channel or signal configured by the higher-layer signaling within the overlapping time units of the A time units and N2. Accordingly, the base station cancels the sending of the downlink channel or signal scheduled by the PDCCH DCI within these time units. As shown in the part with a cross of the light black shadow box in FIG. 5, the terminal thinks that the base station has canceled the sending of the downlink channel or signal within these time units, and thus the terminal cancels the reception of such downlink channel or signal.

After delay N2, the cases described below exist about whether the base station will continue to send the downlink channel or signal scheduled by the PDCCH DCI over T1, whether the terminal will receive the downlink channel or signal scheduled by the PDCCH DCI over T1, and whether the terminal will cancel partial transmission of the uplink channel or signal configured by higher-layer signaling.

Case 1: Although the base station cancels the sending of the downlink channel or signal scheduled by the PDCCH DCI in the light black part with a cross, the base station starts sending the downlink channel or signal scheduled by the PDCCH DCI after delay N2, that is, sends the downlink channel or signal originally scheduled in B time units by the PDCCH DCI within T1 time units, and the base station sends the downlink channel or signal after rate matching is performed on the previous (B−T1) time units. Correspondingly, the terminal receives the downlink channel or signal scheduled by the PDCCH DCI over T1 time units, and the terminal also performs the reception after rate matching is performed on the previous (B−T1) time units. The terminal cancels partial transmission of the uplink channel or signal configured by the higher-layer signaling, that is, cancels the sending over the overlapping time units (white part with a cross) of the A time units and the B time units after N2.

Case 2: Since the transmission of the downlink channel or signal before N2 is canceled, and the base station does not support sending the downlink channel or signal over partial time units scheduled by the PDCCH DCI, so the base station cancels the entire sending of the downlink channel or signal scheduled by the PDCCH DCI, that is, cancels the sending within the B time units. Accordingly, the terminal also cancels the entire reception of the downlink channel or signal scheduled by the PDCCH DCI within the B time units. Moreover, the terminal does not cancel the sending of the uplink channel or signal configured by the higher-layer signaling after N2, that is, the terminal sends the uplink channel or signal configured by the higher-layer signaling within A time units.

Case 3: Within the part of overlapping time domain resources for the downlink channel or signal and the uplink channel or signal among the T1 time units, the base station does not send the downlink channel or signal to the terminal, and correspondingly, the terminal does not receive the downlink channel or signal. However, if part of the time domain resources for the downlink channel or signal still exist, i.e., T3 exists, after the time domain end resource for the uplink channel or signal, the base station sends the downlink channel or signal to the terminal over T3 time units, and the terminal also receives the downlink channel or signal over the T3.

Case 4: Within the part of overlapping time domain resources for the downlink channel or signal and the uplink channel or signal among the T1 time units, the base station does not send the downlink channel or signal to the terminal, and correspondingly, the terminal does not receive the downlink channel or signal. However, if part of the time domain resources for the downlink channel or signal still exist, i.e., T3 exists, after the time domain end resource for the uplink channel or signal, it is necessary to determine whether the base station sends the downlink channel or signal to the terminal over T3 time units according to a length of T3 or the proportion of T3 among B. The system predefines or the base station semi-statically configures a threshold L3 for the length of T3 or a threshold F3 for the proportion of T3 among B. If the number of time units included in T3 is greater than the threshold L3 or the proportion of T3 among B is greater than the threshold F3, the base station sends the downlink channel or signal over T3. Accordingly, the terminal should also receive the downlink channel or signal over T3; otherwise, the base station does not send the downlink channel or signal over T3, and accordingly, the terminal does not need to receive the downlink channel or signal over T3.

Case 5: According to a length of T1 or the proportion of T1 among B, it is determined whether the base station cancels the sending of the downlink channel or signal scheduled by the PDCCH DCI over T1 time units, and accordingly, the terminal decides whether to cancel the reception of the downlink channel or signal scheduled by the PDCCH DCI over the T1 time units and whether to cancel the sending of the uplink channel or signal configured by the higher-layer signaling over overlapping time units of the A time units and N2. The system predefines or the base station semi-statically configures a threshold L1 for the length of T1 or a threshold F1 for the proportion of T1 among B. If the number of time units included in T1 is greater than the threshold L1 or the proportion of T1 among B is greater than the threshold F1, the treatment of case 1 is adopted, and otherwise, the treatment of case 2 is adopted.

Case 6: The repetition factor of the downlink channel or signal scheduled by PDCCH DCI needs to be considered. The repetition factor may be semi-statically configured by the base station or indicated in the PDCCH DCI.

If the repetition factor is n (n is a positive integer), the transmission of the downlink channel or signal scheduled by the PDCCH DCI will be repeated n times. For one or more transmissions among the n times, the treatment of case 1 can be adopted, and for the remaining one or more transmissions among the n times, the treatment of case 2 to case 5 can be adopted. Which of the N transmissions adopts the treatment of case 1 and which adopts the treatment of case 2 to case 5 are decided by using at least one of the included methods described below.

The treatment for a transmission is dynamically indicated in the PDCCH DCI.

Alternatively, the treatment for a repetition is predefined by the system or semi-statically configured by the base station. For example, the treatment of case 1 is adopted for the first repetition, and the treatment of case 2 to case 5 is adopted for the remaining repetitions.

It is to be noted herein that when processing delay (i.e., N2) in preparation of an uplink transmission by the terminal does not end, although it is stipulated in the current protocol that treatment such as cancelation of a transmission cannot be performed, in fact, time domain resources for the uplink transmission and/or the downlink transmission may also be processed in the N2 interval since the uplink transmission is configured by higher-layer signaling and may have been configured before N2.

Embodiment Six

Figure 7:
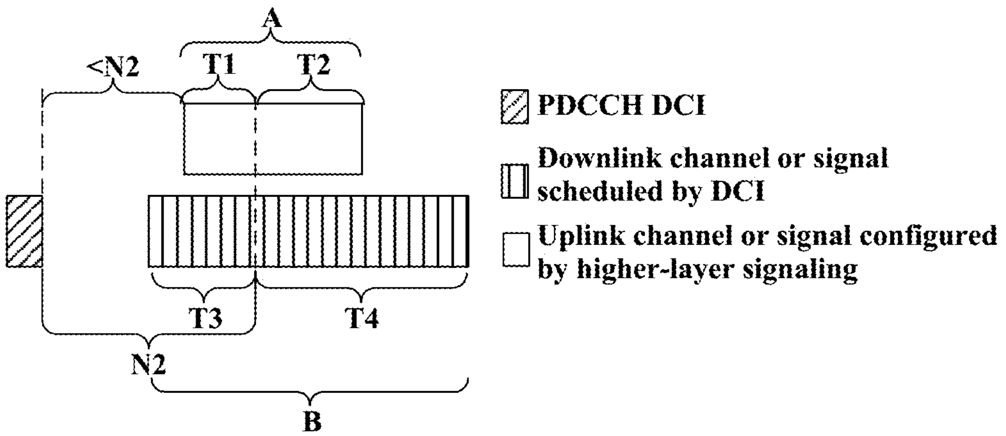
FIG. 7 is a schematic diagram of a transmission time domain according to embodiment six of the present disclosure.

Within time units where a semi-static frame structure configuration is Flexible or no semi-static frame structure configuration is received, a base station sends PDCCH DCI to instruct a terminal to receive a downlink channel or signal over B time units corresponding to the shadow box in FIG. 7. The base station instructs, through a higher-layer signaling configuration, the terminal to send an uplink channel or signal over A time units corresponding to a white box in FIG. 7.

N2 is the processing delay in preparation for an uplink transmission.

As can be seen from FIG. 7, the B time units for the terminal to receive the downlink channel or signal and the A time units for the terminal to send the uplink channel or signal overlap in the time domain, and the time domain position of the B time units is before the time domain position of the A time units. For the transmission of the downlink channel or signal scheduled by the PDCCH DCI and the transmission of the uplink channel or signal configured by higher-layer signaling, the cases described below exist about which can be transmitted and which need to be canceled.

Case 1: The terminal has no time to cancel the transmission of the uplink channel or signal configured by higher-layer signaling in the part within delay N2, so the terminal sends partial transmission of the uplink channel or signal configured by the higher-layer signaling within T1 time units, and naturally, the base station cancels the transmission of the downlink channel or signal scheduled by the PDCCH DCI within delay N2, that is, cancels the sending of the downlink channel or signal over T3 time units. Accordingly, the terminal also cancels the reception of the downlink channel or signal scheduled by the PDCCH DCI over the T3 time units. The method in embodiment five can be adopted for a case after delay N2.

Case 2: The transmission of the downlink channel or signal scheduled by the PDCCH DCI is before the transmission of the uplink channel or signal configured by higher-layer signaling, so the base station sends the downlink channel or signal scheduled by the PDCCH DCI over B time units. Accordingly, the terminal also receives the downlink channel or signal scheduled by the PDCCH DCI over the B time units. The terminal cancels the sending of the uplink channel or signal configured by higher-layer signaling over A time units, that is, the terminal cancels the entire transmission of the uplink channel or signal configured by the higher-layer signaling.

Embodiment Seven

Figure 8:
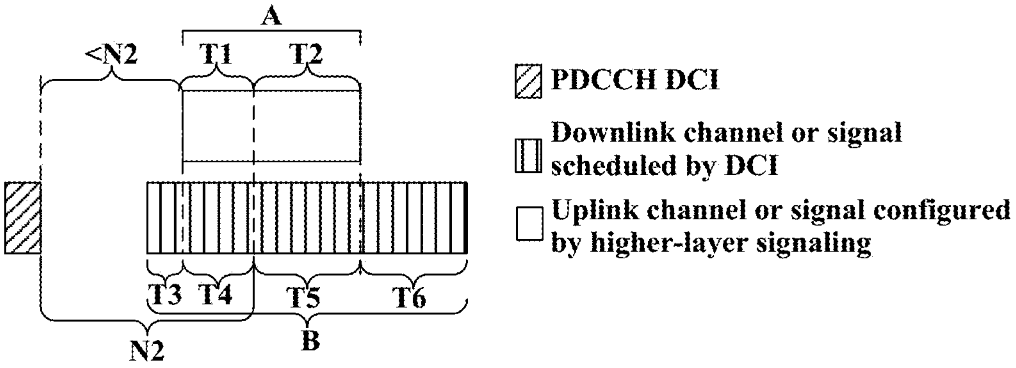
FIG. 8 is a schematic diagram of a transmission time domain according to embodiment seven of the present disclosure.

Within time units where a semi-static frame structure configuration is Flexible or no semi-static frame structure configuration is received, a base station sends PDCCH DCI to instruct a terminal to receive a downlink channel or signal over B time units corresponding to the shadow box in FIG. 8. The base station instructs, through a higher-layer signaling configuration, the terminal to send an uplink channel or signal over A time units corresponding to a white box in FIG. 8.

N2 is the processing delay in preparation for an uplink transmission.

As can be seen from FIG. 8, the B time units for the terminal to receive the downlink channel or signal and the A time units for the terminal to send the uplink channel or signal overlap in the time domain, and the time domain position of the B time units is before the time domain position of the A time units. For the transmission of the downlink channel or signal scheduled by the PDCCH DCI and the transmission of the uplink channel or signal configured by higher-layer signaling, the cases described below exist about which can be transmitted and which need to be canceled.

Case 1: The transmission of the downlink channel or signal scheduled by the PDCCH DCI has a higher priority than the transmission of the uplink channel or signal configured by the higher-layer signaling. Therefore, the transmission of the uplink channel or signal configured by the higher-layer signaling over A time units is completely canceled. The transmission of the downlink channel or signal scheduled by the PDCCH DCI over B time units can be sent by the base station and accordingly is also received by the terminal over the B time units.

Case 2: N2 is used as a threshold, and determination is performed for the time period within N2 time units after the end symbol of the PDCCH DCI and the time period after the N2 time units, separately.

For the time period within N2 time units after the end symbol of the PDCCH DCI, the terminal sends the uplink channel or signal configured by higher-layer signaling over T1 time units, the base station does not send the downlink channel or signal scheduled by PDCCH DCI over T4 time units, and accordingly, the terminal also does not receive the downlink channel or signal scheduled by the PDCCH DCI over the T4 time units. For T3 time units, two possibilities are included.

Possibility 1: Since T3 is before T1, the downlink channel or signal scheduled by the PDCCH DCI is sent by the base station over T3 time units and accordingly is also received by the terminal.

Possibility 2: According to the number of time units included in T3 or the proportion of T3 among (T3+T4), it is determined whether the downlink channel or signal scheduled by the PDCCH DCI is sent by the base station over T3 time units and is received by the terminal. If the number of time units included in T3 is greater than a threshold N1 or the proportion of T3 among (T3+T4) is greater than a threshold P1, the downlink channel or signal scheduled by the PDCCH DCI is sent by the base station over the T3 time units and accordingly is received by the terminal.

For the time period within N2 time units after the end symbol of the PDCCH DCI, the possibilities described below are included.

Possibility 1: The terminal does not send the uplink channel or signal configured by higher-layer signaling over T2 time units. The downlink channel or signal scheduled by the PDCCH DCI is sent by the base station over (T5+T6) time units and accordingly is received by the terminal.

Possibility 2: The terminal sends the uplink channel or signal configured by higher-layer signaling over T2 time units. The downlink channel or signal scheduled by the PDCCH DCI is not sent by the base station over T5 time units and accordingly is not received by the terminal. The downlink channel or signal scheduled by the PDCCH DCI is sent by the base station over T5 time units and accordingly is received by the terminal.

Under the preceding various cases or possibilities, if the available time domain resources for the downlink channel or signal scheduled by PDCCH DCI are fewer than the time domain resources scheduled by the PDCCH DCI, the base station performs rate matching on the unavailable time domain resources when sending the downlink channel or signal; and accordingly the terminal also performs rate matching on unavailable time domain resources when receiving the downlink channel or signal.

Embodiment Eight

Figure 9:
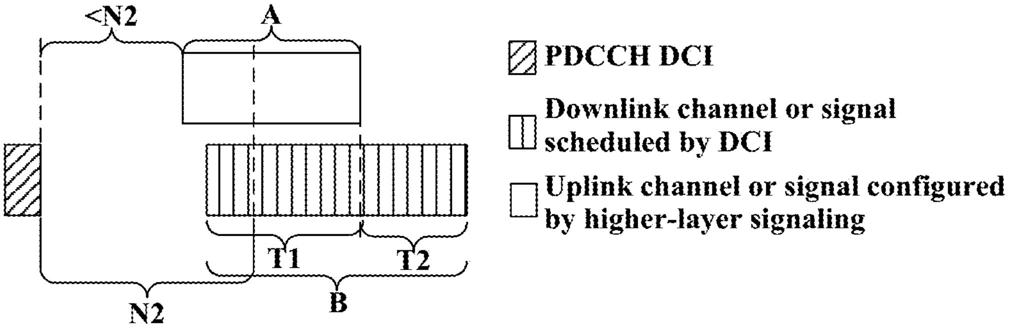
FIG. 9 is a schematic diagram of a transmission time domain according to embodiment eight of the present disclosure.

Within time units where a semi-static frame structure configuration is Flexible or no semi-static frame structure configuration is received, a base station sends PDCCH DCI to instruct a terminal to receive a downlink channel or signal over B time units corresponding to the shadow box in FIG. 9. The base station instructs, through a higher-layer signaling configuration, the terminal to send an uplink channel or signal over A time units corresponding to a white box in FIG. 9.

N2 is the processing delay in preparation for an uplink transmission.

Since the starting time unit of the uplink channel or signal configured by higher-layer signaling is before the starting time unit of the downlink channel or signal scheduled by the PDCCH DCI and is also within delay N2 after the end symbol of the PDCCH DCI, the terminal does not cancel the uplink channel or signal, that is, the terminal sends the uplink channel or signal configured by higher-layer signaling over A time units. Then, the base station cancels the sending of the downlink channel or signal scheduled by the PDCCH DCI over T1 time units, and accordingly, the terminal does not receive the downlink channel or signal scheduled by the PDCCH DCI over the T1 time units. Since only the downlink channel or signal scheduled by PDCCH DCI exists over T2 time units, the downlink channel or signal scheduled by the PDCCH DCI is sent by the base station over the T2 time units and accordingly is received by the terminal over the T2 time units.

In summary, the base station performs rate matching on T1 time units and only sends the downlink channel or signal scheduled by the PDCCH DCI over T2 time units. Accordingly, the terminal also performs rate matching on T1 time units and only receives the downlink channel or signal scheduled by the PDCCH DCI over the T2 time units.

Embodiment Nine

Figure 10:
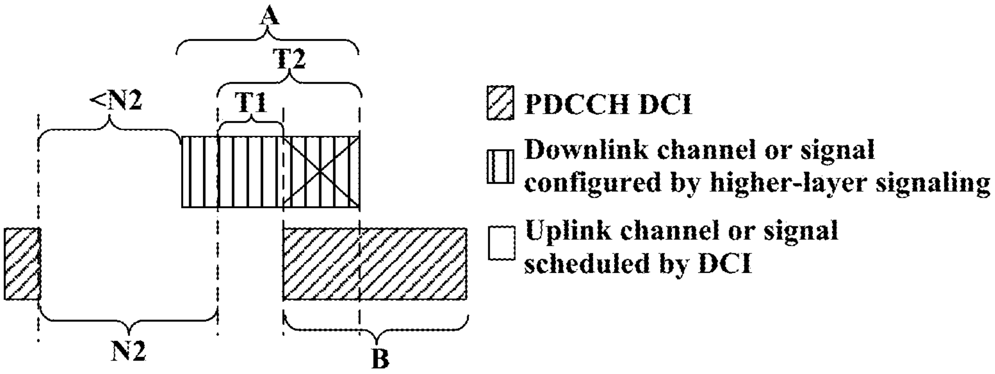
FIG. 10 is a schematic diagram of a transmission time domain according to embodiment nine of the present disclosure.

Within time units where a semi-static frame structure configuration is Flexible or no semi-static frame structure configuration is received, a base station sends PDCCH DCI to instruct a terminal to send an uplink channel or signal over B time units corresponding to the white shadow box in FIG. 10. The base station instructs, through a higher-layer signaling configuration, the terminal to receive a downlink channel or signal over A time units corresponding to a vertical line box in FIG. 10.

N2 is the processing delay in preparation for an uplink transmission.

As can be seen from FIG. 10, the A time units for the terminal to receive the downlink channel or signal and the B time units for the terminal to send the uplink channel or signal overlap in the time domain, and the time domain position of the A time units is before the time domain position of the B time units.

The uplink channel or signal transmission indicated by the PDCCH DCI has a higher priority than the downlink channel or signal transmission configured by the higher-layer signaling. Therefore, on the basis of satisfying delay N2, within the overlapping time units of the A time units and the B time units, the terminal sends the uplink channel or signal scheduled by the PDCCH DCI and cancels the reception of the downlink channel or signal configured by the higher-layer signaling, that is, the terminal cancels the reception of the downlink channel or signal in the light black part with a cross. Accordingly, the base station cancels the sending of the downlink channel or signal in the light black part with a cross.

However, since the downlink channel or signal configured by the higher-layer signaling has already been sent before the delay N2, the base station sends the downlink signal or signal configured by the higher-layer signaling within the delay N2, and the UE also accordingly receives the downlink channel or signal according to the configuration of the higher-layer signaling.

After the delay N2, how the base station and terminal perform processing within T1 time units includes the cases described below.

Case 1: Since the uplink channel or signal scheduled by PDCCH DCI is not to be sent immediately within T1 time units after the delay N2 and before the uplink channel or signal scheduled by the PDCCH DCI is sent, the base station continues to send the downlink channel or signal configured by higher-layer signaling, and accordingly, the terminal also receives the downlink channel or signal configured by the higher-layer signaling within T1 time units.

Case 2: Although the uplink channel or signal scheduled by PDCCH DCI is not to be sent immediately within T1 time units after the delay N2, the base station does not send the downlink channel or signal configured by higher-layer signaling and the terminal does not receive the corresponding downlink channel or signal within T1 time units since these two transmissions overlap in the time domain after T1. The terminal does not send the uplink channel or signal scheduled by PDCCH DCI until it is time for sending the uplink channel or signal scheduled by the PDCCH DCI.

Case 3: According to the number of time units included in T1, or the proportion of T1 among T2, or the proportion of T1 among A, it is determined whether the base station sends the downlink channel or signal configured by higher-layer signaling within T1 time units and whether the terminal receives the downlink channel or signal configured by higher-layer signaling within the T1 time units. The system predefines or the base station semi-statically configures a threshold L1 for the length of T1, or a threshold F1 for the proportion of T1 among A, or a threshold F2 for the proportion of T1 among T2. If the number of time units included in T1 is greater than L1, or the proportion of T1 among Ais greater than F1, or the proportion of T1 among T2 is greater than F2, the base station sends the downlink channel or signal configured by higher-layer signaling within T1 time units, and accordingly, the terminal also receives the downlink channel or signal configured by the higher-layer signaling within the T1 time units. Otherwise, the downlink channel or signal configured by the higher-layer signaling is not sent by the base station within the T1 time units and is not received by the terminal.

Embodiment Ten

Figure 11:
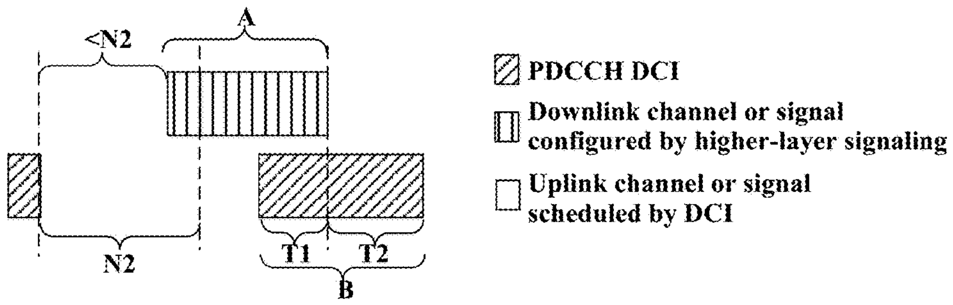
FIG. 11 is a schematic diagram of a transmission time domain according to embodiment ten of the present disclosure.

Within time units where a semi-static frame structure configuration is Flexible or no semi-static frame structure configuration is received, a base station sends PDCCH DCI to instruct a terminal to send an uplink channel or signal over B time units corresponding to the white shadow box in FIG. 11. The base station instructs, through a higher-layer signaling configuration, the terminal to receive a downlink channel or signal over A time units corresponding to a light black box in FIG. 11.

N2 is the processing delay in preparation for an uplink transmission.

Since the starting time unit of the uplink channel or signal configured by the higher-layer signaling is within N2 time units after the end symbol of the PDCCH DCI, the transmission of the uplink channel or signal configured by the higher-layer signaling is not canceled, that is, the base station sends the downlink channel or signal configured by the higher-layer signaling over A time units. Accordingly, the terminal also receives the downlink channel or signal scheduled by the higher-layer signaling over the A time units. Then, the terminal cancels the sending of the uplink channel or signal scheduled by the PDCCH DCI over T1 time units. Since no conflict exists between uplink and downlink transmissions over T2 time units, the terminal sends the uplink channel or signal scheduled by PDCCH DCI over the T2 time units, and the base station also receives the corresponding channel or signal.

If the available time domain resources for the uplink channel or signal scheduled by PDCCH DCI are fewer than the time domain resources scheduled by the PDCCH DCI, the terminal performs rate matching on the unavailable time domain resources when sending the uplink channel or signal; and accordingly the terminal also performs rate matching on unavailable time domain resources when receiving the uplink channel or signal.

Embodiment Eleven

PDCCH DCI that schedules a downlink channel or signal indicates whether it is allowed to cancel the downlink channel or signal scheduled by the PDCCH DCI when time domain resources for the scheduled downlink channel or signal overlap time domain resources for a semi-statically configured uplink channel or signal. The indication methods described below are specifically included.

A "priority indication" field is added to the PDCCH DCI and indicates whether the transmission of the currently scheduled downlink channel or signal can be canceled. If the domain indicates "Yes", the currently scheduled downlink channel or signal can be canceled; if the domain indicates "No", the currently scheduled downlink channel or signal cannot be canceled.

A DCI format type corresponding to the PDCCH DCI is used for indication. If the corresponding DCI format type corresponds to high-priority traffic, the currently scheduled downlink channel or signal cannot be canceled; if the corresponding DCI format type does not correspond to high-priority traffic, the currently scheduled downlink channel or signal can be canceled. For example, high-priority traffic corresponds to compact DCI format, and low-priority traffic corresponds to non-compact DCI format.

A scrambling RNTI type corresponding to the PDCCH DCI is used for indication. If a first RNTI type is used for scrambling a CRC check bit of the PDCCH DCI, the currently scheduled downlink channel or signal cannot be canceled; if other RNTIs other than the first RNTI type are used for scrambling the CRC check bit of the PDCCH DCI, the currently scheduled downlink channel or signal can be canceled.

The repetition factor of the transmission of the downlink channel or signal scheduled by the PDCCH configured for the user by higher-layer signaling is combined with the specific repetition of the current transmission of the downlink channel or signal to determine whether the current transmission of the downlink channel or signal can be canceled. For example, the repetition factor is configured by higher-layer signaling to be m, the current transmission of the downlink channel or signal is the n-th transmission, and n is less than or equal to m, and then whether the n-th transmission of the downlink channel or signal can be canceled is determined according to which of the m transmissions can be canceled and which cannot be canceled predefined by the system or semi-statically configured by the base station.

It is to be specially noted that canceling the downlink channel or signal within a certain period of time described in embodiments three to eleven refers to canceling the time domain resources corresponding to the downlink channel or signal within the certain period of time; similarly, canceling the uplink channel or signal within a certain period of time described in embodiments three to eleven refers to canceling the time domain resources corresponding to the uplink channel or signal within the certain period of time.

In addition, in embodiments three to eleven, it is considered that a reception and sending conversion delay exists for the terminal, so the terminal neither can perform the reception operation immediately after the completion of the sending operation nor can perform the sending operation immediately after the completion of the reception operation. In this regard, the terminal itself may reserve the conversion delay between the reception operation and the sending operation, or the system may predefine or the base station may semi-statically configure which time domain resources are used as the conversion delay. No reception operation or sending operation can be performed over the conversion delay.

Embodiment Twelve

The concept of "available paging PDCCH monitoring occasion" is introduced in a non-default associated paging transmission mode, and such available paging PDCCH monitoring occasion refers to a monitoring occasion that does not conflict with an uplink slot/uplink symbol. Moreover, one available paging PDCCH monitoring occasion corresponds to one actually transmitted SSB, thus saving the blind detection overhead of receiving paging by the terminal.

In NR, many levels of uplink resources exist, for example, semi-static common uplink resources (that is, uplink resources configured by higher-layer signaling "tdd-UL-DL-ConfigCommon or tdd-UL-DL-ConfigCommon2"), semi-static dedicated uplink resources (that is, uplink resources configured by higher-layer signaling "tdd-UL-DL-ConfigDedicated"), and dynamic uplink resources (that is, uplink resources configured through SFI (DCI format 2_0)). A UE has different understandings of different levels of uplink resources. It is not specified that the uplink slot/uplink symbol mentioned in the preceding defined available paging PDCCH monitoring occasion belongs to what level of uplink resource, which will cause ambiguity for the understanding of the UE. Thus, embodiments twelve and thirteen are proposed.

In the embodiment, "available paging PDCCH monitoring occasion" is defined to be not in conflict with a semi-static common uplink resource.

Figure 12:
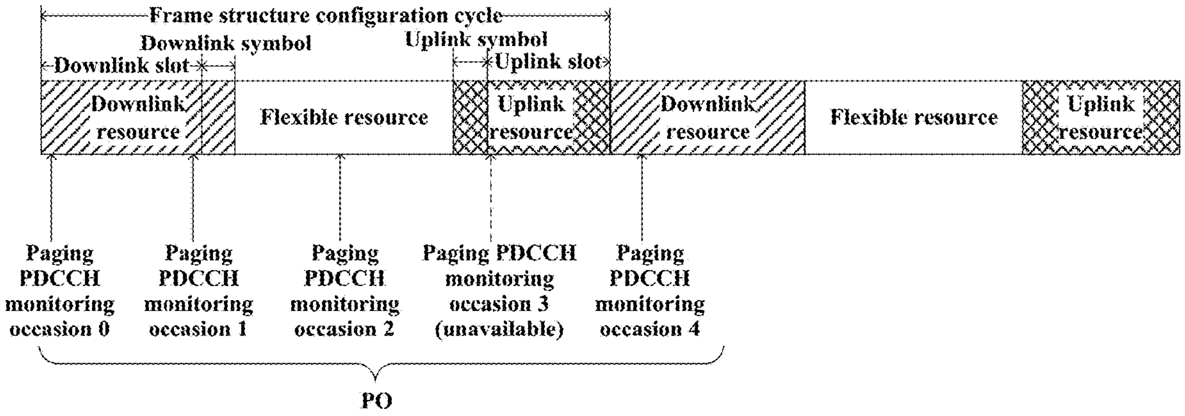
FIG. 12 is a schematic diagram of a paging PDCCH search space configuration according to embodiment twelve of the present disclosure.

As shown in FIG. 12, according to a paging PDCCH search space configuration (that is, Type 2-PDCCH common search space set), the specific parameter includes monitoring cycle and offset, monitoring duration, and the like. The following paging PDCCH monitoring occasions 0 to N exist. These paging PDCCH monitoring occasions correspond to resources with different attributes (such as semi-static downlink resources, semi-static flexible resources, and semi-static uplink resources) in semi-static common and/or dedicated frame structure configurations. The UE and the base station need to have a unified understanding of which paging PDCCH monitoring occasions are available. If the UEs receiving paging include idle UEs, these UEs may only obtain semi-static common frame structure configurations (that is, only receive the frame structures configured by the higher-layer signaling "tdd-UL-DL-ConfigCommon" or "tdd-UL-DL-ConfigCommon2"). Therefore, in the embodiment, "available paging PDCCH monitoring occasion" is defined to be not in conflict with a semi-static common uplink resource and/or a semi-static dedicated uplink resource.

In such configuration, as shown in FIG. 12, four actually transmitted SSBs (such as SSBs 2, 4, 6, and 7) exist, so it is necessary to define four available paging PDCCH monitoring occasions which are in one-to-one correspondence with the SSBs. Paging PDCCH monitoring occasion 3 is in conflict with a semi-static common uplink resource and thus is not an available paging PDCCH monitoring occasion. Further, monitoring occasions 0, 1, 2, and 4 are determined to be available paging PDCCH monitoring occasions and correspond to the actually transmitted SSBs 2, 4, 6, and 7, respectively, in chronological order.

In addition, in such configuration mode, when corresponding to a semi-static common flexible resource, a paging PDCCH monitoring occasion is defined as an available monitoring occasion. Therefore, if a paging message on a network side needs to be transmitted, the resource corresponding to the paging PDCCH monitoring occasion on the flexible resources is not allowed to transmit other information, that is, on the semi-static common flexible resource, the actually transmitted paging PDCCH can rewrite the dynamic frame structure configuration and the semi-static dedicated frame structure configuration (that is, the frame structure configured by the higher-layer signaling "tdd-UL-DL-ConfigDedicated") that is in conflict with the actually transmitted paging PDCCH.

In this manner, what level of uplink resource the uplink slot/uplink symbol mentioned in the available paging PDCCH monitoring occasion is is specified, thus ensuring that no ambiguity is caused for the understanding of the UE.

Embodiment Thirteen

In the embodiment, "available paging PDCCH monitoring occasion" is defined to be not in conflict with "a semi-static uplink resource and a semi-static flexible resource".

Figure 13:
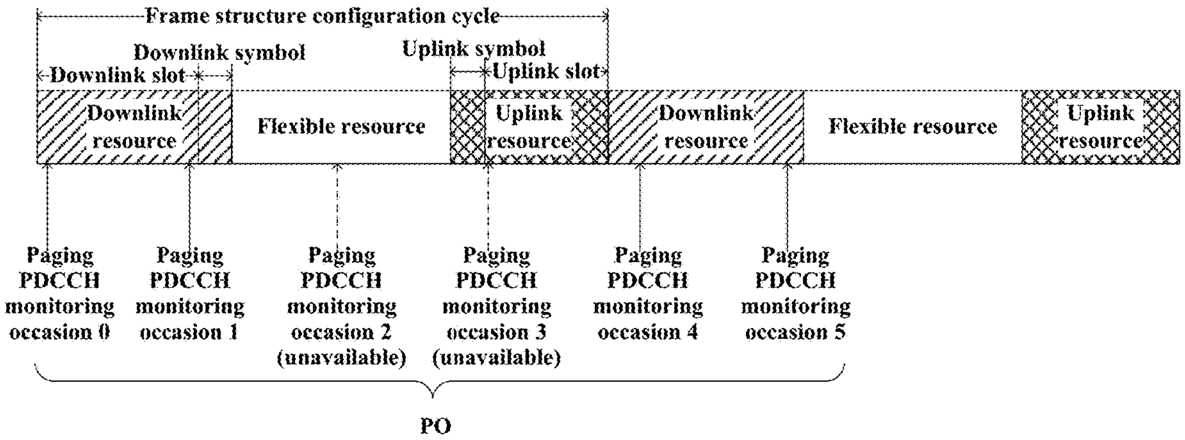
FIG. 13 is a schematic diagram of another paging PDCCH search space configuration according to embodiment thirteen of the present disclosure.

As shown in FIG. 13, according to a paging PDCCH search space configuration (that is, Type 2-PDCCH common search space set), the specific parameter includes monitoring cycle and offset, monitoring duration, and the like. The following paging PDCCH monitoring occasions 0 to N exist. These paging PDCCH monitoring occasions correspond to resources with different attributes (such as semi-static common downlink resources, semi-static flexible resources, semi-static common uplink resources, semi-static dedicated downlink resources, semi-static dedicated flexible resources, and semi-static dedicated common uplink resources) in semi-static frame structure configurations. The UE and the base station need to have a unified understanding of which paging PDCCH monitoring occasions are available. The UEs receiving paging include idle UEs, and these UEs may only obtain semi-static common frame structure configurations (that is, only receive the frame structures configured by the higher-layer signaling "tdd-UL-DL-ConfigCommon or tdd-UL-DL-ConfigCommon2"). Therefore, in the embodiment, "available paging PDCCH monitoring occasion" is defined to be not in conflict with "a semi-static common uplink resource and a semi-static common flexible resource" and/or "a semi-static dedicated uplink resource and a semi-static dedicated flexible resource".

In such configuration, as shown in FIG. 13, four actually transmitted SSBs (such as SSBs 2, 4, 6, and 7) exist, so it is necessary to define four available paging PDCCH monitoring occasions which are in one-to-one correspondence with the SSBs. Paging PDCCH monitoring occasion 2 is in conflict with a semi-static common flexible resource and thus is not an available paging PDCCH monitoring occasion; paging PDCCH monitoring occasion 3 is in conflict with a semi-static common uplink resource and thus is not an available paging PDCCH monitoring occasion. Further, monitoring occasions 0, 1, 4, and 5 are determined to be available paging PDCCH monitoring occasions and correspond to the actually transmitted SSBs 2, 4, 6, and 7, respectively, in chronological order. In this manner, what level of uplink resource the uplink slot/uplink symbol mentioned in the available paging PDCCH monitoring occasion is is specified, thus ensuring that no ambiguity is caused for the understanding of the UE.

Embodiment Fourteen

Figure 14:
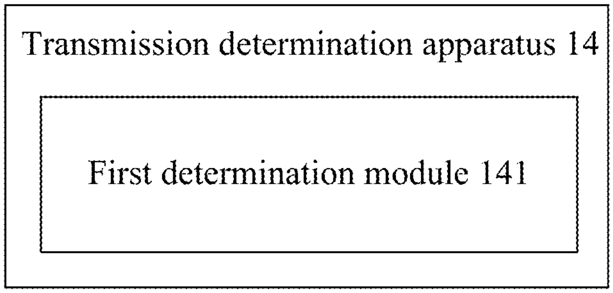
FIG. 14 is a structure diagram of a transmission determination apparatus according to embodiment fourteen of the present disclosure.

The embodiment provides a transmission determination apparatus. It is to be noted that in the embodiment, the transmission determination apparatus may be applied to a terminal or a base station. FIG. 14 is a transmission determination apparatus 14 provided in the embodiment. As shown in FIG. 14, the transmission determination apparatus 14 includes a first determination module 141. The first determination module 141 is configured to determine, according to first information, whether to receive a first transmission, and/or determine, according to first information, whether to send a second transmission, so that the first transmission is received or the second transmission is sent at one time moment.

It is to be noted that the first information in the embodiment includes at least one of the following pieces of information:

whether time domain resources for the first transmission overlap time domain resources for the second transmission;

a sequence relationship between a time domain starting resource for the first transmission and a time domain starting resource for the second transmission;

first indication signaling; or a size of overlapping time domain resources for the first transmission and the second transmission.

It is to be noted that the first transmission in the embodiment includes a transmission scheduled by DCI, and the second transmission includes a transmission configured by higher-layer signaling. Specifically, the first transmission may be a transmission scheduled by DCI, and the second transmission may be a transmission configured by higher-layer signaling.

It is to be further noted that the transmission in the embodiment may be an uplink channel or signal transmission or a downlink channel or signal transmission.

It is to be understood that corresponding time domain resources are configured for a transmission to ensure that the transmission can be sent or received on the corresponding time domain resources.

However, it is to be noted that receiving the first transmission in the embodiment includes receiving the first transmission on part of the time domain resources for the first transmission or receiving the first transmission on all of the time domain resources for the first transmission. That is, the first transmission may be received on all of the time domain resources allocated to the first transmission, or the first transmission may be received on a certain part of the time domain resources allocated to the first transmission. If the first transmission is received on the certain part of the time domain resources, the unavailable time domain resources need to be subjected to rate matching when the first transmission is received.

Similarly, sending the second transmission in the embodiment includes sending the second transmission on part of the time domain resources for the second transmission or sending the second transmission on all of the time domain resources for the second transmission. That is, the second transmission may be sent on all of the time domain resources allocated to the second transmission, or the second transmission may be sent on a certain part of the time domain resources allocated to the second transmission. If the second transmission is sent on the certain part of the time domain resources, the unavailable time domain resources need to be subjected to rate matching when the second transmission is sent.

It is to be noted that, in the embodiment, both, one, or neither of the time domain starting resource for the first transmission and the time domain starting resource for the second transmission may fall within a first time period.

It is to be noted that the first time period in the embodiment is a time period with a duration of t starting from an end time of downlink control information scheduling the first transmission. In an implementation of the embodiment, the first time period may be the processing delay of sending an uplink channel or signal.

For example, as shown in FIG. 3, the first time period is processing delay N2, the time domain starting resource for the first transmission represented by a vertical line shadow box is outside the first time period, and the time domain starting resource for the second transmission corresponding to a white box is within the first time period. For example, as shown in FIG. 5, the first time period is processing delay N2, and the time domain starting resource for the first transmission represented by a vertical line shadow box and the time domain starting resource for the second transmission corresponding to a white box are both within the first time period.

In the embodiment, a first threshold may also be predefined by a system or semi-statically configured for a terminal by a base station. In this manner, in a case where the first information includes the size of the overlapping time domain resources for the first transmission and the second transmission, it is determined to receive the first transmission when all or part of the overlapping time domain resources for the first transmission and the second transmission are less than or equal to the first threshold, or it is determined not to receive the first transmission when all or part of the overlapping time domain resources for the first transmission and the second transmission are greater than the first threshold.

It is to be noted that the step in which it is determined to receive the first transmission when part of the overlapping time domain resources for the first transmission and the second transmission are less than or equal to the first threshold, or it is determined not to receive the first transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to receive the first transmission when the one portion that falls within the first time period is less than or equal to the first threshold, or it is determined not to receive the first transmission when the one portion that falls within the first time period is greater than the first threshold; or the other portion that falls outside the first time period is compared with the first threshold, and it is determined to receive the first transmission when the other portion that falls outside the first time period is less than or equal to the first threshold, or it is determined not to receive the first transmission when the other portion that falls outside the first time period is greater than the first threshold.

Similarly, for the second transmission in the embodiment, a second threshold may also be predefined by the system or semi-statically configured for the terminal by the base station. In this manner, in a case where the first information includes the size of the overlapping time domain resources for the first transmission and the second transmission, it is determined to send the second transmission when all or part of the overlapping time domain resources for the first transmission and the second transmission are less than or equal to the second threshold, or it is determined not to send the second transmission when all or part of the overlapping time domain resources for the second transmission and the second transmission are greater than the first threshold.

It is to be noted that the step in which it is determined to send the second transmission when part of the overlapping time domain resources for the first transmission and the second transmission are less than or equal to the first threshold, or it is determined not to send the second transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to send the second transmission when the one portion that falls within the first time period is less than or equal to the first threshold, or it is determined not to send the second transmission when the one portion that falls within the first time period is greater than the first threshold; or the other portion that falls outside the first time period is compared with the first threshold, and it is determined to send the second transmission when the other portion that falls outside the first time period is less than or equal to the first threshold, or it is determined not to send the second transmission when the other portion that falls outside the first time period is greater than the first threshold.

It is to be noted that the first threshold and the second threshold configured in the embodiment may be the same or different. Specially, when the configured first threshold and the configured second threshold are the same, only one threshold may be required in the terminal and/or the base station to represent both the first threshold and the second threshold.

It is specially to be noted that in the embodiment, when it is determined, according to the first information, to receive the first transmission, if the first transmission is received on part of the time domain resources for the first transmission, rate matching may also be performed on the part of the time domain resources for the first transmission that are not used for receiving the first transmission when the first transmission is received, so that the channel or signal of the first transmission is ensured to be completely received on the part of the time domain resources for receiving the first transmission.

Similarly, in the embodiment, when it is determined, according to the first information, to send the second transmission, if the second transmission is sent on part of the time domain resources for the second transmission, rate matching may also be performed on the part of the time domain resources for the second transmission that are not used for sending the second transmission when the second transmission is sent, so that the channel or signal of the second transmission is ensured to be completely sent on the part of the time domain resources for sending the second transmission.

In the embodiment, in a case where the first information includes whether the time domain resources for the first transmission overlap the time domain resources for the second transmission and the sequence relationship between the time domain starting resource for the first transmission and the time domain starting resource for the second transmission, in response to the time domain resources for the first transmission overlapping the time domain resources for the second transmission, and in response to the time domain starting resource for the first transmission being before the time domain starting resource for the second transmission within a first time period, the first transmission may be received on the time domain resources for the first transmission, and the sending of the second transmission on part or all of the time domain resources for the second transmission is canceled.

In the embodiment, in a case where the first information includes whether the time domain resources for the first transmission overlap the time domain resources for the second transmission, the step of determining, according to the first information, whether to receive the first transmission, and determining, according to the first information, whether to send the second transmission may be as described below.

In response to the time domain resources for the first transmission overlapping the time domain resources for the second transmission after the first time period, the second transmission is sent on part of the time domain resources for the second transmission before the time domain starting resource for the first transmission, and the first transmission is received on all of the time domain resources corresponding to the first transmission.

In the embodiment, in a case where the first information includes whether the time domain resources for the first transmission overlap the time domain resources for the second transmission, the step of determining, according to the first information, whether to receive the first transmission may be as described below.

In response to the time domain resources for the first transmission overlapping the time domain resources for the second transmission, and in a case where the time domain starting resource for the second transmission is earlier than the time domain starting resource for the first transmission, the first transmission is received on part of the time domain resources for the first transmission, or the first transmission is not received.

Specifically, the step of receiving the first transmission on the part of the time domain resources for the first transmission may be as described below.

The first transmission is received on time domain resources for the first transmission after the first time period. For example, as shown in FIG. 5, the first transmission may be received over the entire time period T1 after N2 (time domain resources for the second transmission after N2 are canceled correspondingly).

Alternatively, the first transmission is received on time domain resources for the first transmission after an end of the time domain resources for the second transmission. For example, as shown in FIG. 6, the first transmission may be received over a time period T3 after N2 (correspondingly, time domain resources in T1 except T3 for the first transmission are canceled, and the time domain resources for the second transmission are not canceled).

In the embodiment, in response to the time domain resources for the first transmission overlapping the time domain resources for the second transmission, and in the case where the time domain starting resource for the second transmission is earlier than the time domain starting resource for the first transmission, it is may be specifically determined whether to receive the first transmission on the part of the time domain resources for the first transmission or not to receive the first transmission according to the number of symbols included in time domain resources for the first transmission after the first time period and/or a proportion of time domain resources for the first transmission after the first time period among all of the time domain resources corresponding to the first transmission.

Specifically, a number of symbols threshold and/or a proportion threshold is predefined by the system or semi-statically configured by the base station.

Thus, in a case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission is received on the part of the time domain resources for the first transmission; otherwise, the first transmission is not received.

For example, receiving the first transmission on the part of the time domain resources for the first transmission is receiving the first transmission on time domain resources for the first transmission after the first time period; then, in the case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission may be received on the time domain resources for the first transmission after the first time period, and otherwise, the first transmission is not received.

In an implementation of the embodiment, in a case where the first information includes whether the time domain resources for the first transmission overlap the time domain resources for the second transmission, the step of determining, according to the first information, whether to send the second transmission may be as follows: in response to the time domain resources for the first transmission overlapping the time domain resources for the second transmission, and in a case where the time domain starting resource for the first transmission is before the time domain starting resource for the second transmission, the second transmission is sent on part of the time domain resources for the second transmission, or the second transmission is not sent.

In an implementation of the embodiment, in a case where the first information includes whether the time domain resources for the first transmission overlap the time domain resources for the second transmission, the step of determining, according to the first information, whether to receive the first transmission may be as follows: in response to the time domain resources for the first transmission overlapping the time domain resources for the second transmission, and in a case where the time domain starting resource for the first transmission is before the time domain starting resource for the second transmission, the first transmission is received on part of the time domain resources for the first transmission, or the first transmission is not received.

Receiving the first transmission on part of the time domain resources for the first transmission may specifically be receiving the first transmission on part of the time domain resources for the first transmission after the first time period.

In the embodiment, the first indication signaling is signaling scheduling the first transmission and/or semi-static configuration signaling.

In a case where the first indication signaling is the signaling scheduling the first transmission, whether to receive the first transmission is determined according to the first indication signaling in at least one of the included manners described below.

1. Whether to receive the first transmission is determined according to a priority indication domain in the first indication signaling.

In the embodiment, a "priority indication" field may be added to the PDCCH DCI and indicates whether a channel or signal currently scheduled by the DCI can be canceled. If the domain indicates "Yes", the channel or signal currently scheduled by the DCI can be canceled; if the domain indicates "No", the channel or signal currently scheduled by the DCI cannot be canceled.

2. Whether to receive the first transmission is determined according to a DCI format type for sending the first indication signaling.

In the embodiment, a DCI format type corresponding to the PDCCH DCI may be used for indication. If the corresponding DCI format type corresponds to high-priority traffic, the channel or signal currently scheduled by the DCI cannot be canceled; if the corresponding DCI format type does not correspond to high-priority traffic, the channel or signal currently scheduled by the DCI can be canceled. For example, high-priority traffic corresponds to compact DCI format, and low-priority traffic corresponds to non-compact DCI format.

3. Whether to receive the first transmission is determined according to a radio network temporary identifier (RNTI) type for blindly detecting the first indication signaling.

In the embodiment, a scrambling RNTI type corresponding to the PDCCH DCI may be used for indication. If a first RNTI type is used for scrambling a cyclic redundancy check (CRC) check bit of the PDCCH DCI, the channel or signal currently scheduled by the DCI cannot be canceled; if other RNTIs other than the first RNTI type are used for scrambling the CRC check bit of the PDCCH DCI, the channel or signal currently scheduled by the DCI can be canceled.

In a case where the first indication signaling is the semi-static configuration signaling, whether to receive the first transmission is determined according to the first indication signaling in at least one of the included manners described below.

1. Whether to receive the first transmission is determined according to a repetition factor indicated in the first indication signaling and a repetition serial number of a current first transmission.

In the embodiment, the repetition factor may be predefined by the system or semi-statically configured by the base station. The first indication signaling may specify that only the first transmission of a specific repetition serial number can be canceled. For example, if the repetition factor is 4, the current first transmission needs to be received 4 times, and then it may be set that one or several of these 4 times can be canceled. For example, the repetition factor is configured by higher-layer signaling to be m, the current first transmission is the n-th first transmission, and n is less than or equal to m, and then whether the n-th first transmission can be received is determined according to which of the m transmissions can be canceled and which cannot be canceled predefined by the system or semi-statically configured by the base station. It is to be noted that canceling the first transmission refers to canceling all of the time domain resources for the first transmission.

2. Whether to receive the first transmission is determined according to a first transmission redundancy version determined by the first indication signaling and a redundancy version (RV) used in a current first transmission.

In the embodiment, a RV number for each first transmission may be predefined by the system or semi-statically configured by the base station. The first indication signaling may specify that only the first transmission of a specific RV number can be canceled. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission can be canceled when RV is 2 and 4, so only the second and fourth first transmissions can be canceled among these four first transmissions. It is to be noted that canceling the first transmission refers to canceling all of the time domain resources for the first transmission. In the embodiment, a RV number for each first transmission may be predefined by the system or semi-statically configured by the base station. The first indication signaling may specify that only the first transmission of a specific RV number is received. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission is received when RV is 0 and 1, so only the first and fourth first transmissions are received among these four first transmissions.

The current first transmission is the n-th first transmission, n is less than or equal to m, and then whether the n-th first transmission can be received is determined according to which of the m transmissions can be canceled and which cannot be canceled predefined by the system or semi-statically configured by the base station.

In addition, in the embodiment, determining, according to the first indication signaling, whether to receive the first transmission may further be: determining, according to a rule predefined by the system, whether to receive the first transmission.

In the embodiment, whether to receive the first transmission is determined according to the rule predefined by the system in at least one of the included manners described below.

1. It is determined whether to receive the first transmission according to a repetition serial number of a current first transmission and a specific repetition serial number predefined by the system.

In the embodiment, the system may predefine or the base station may semi-statically configure the repetition factor and may also directly specify that only the first transmission of a specific repetition serial number can be received. Thus, when the repetition serial number of the current first transmission is the specific repetition serial number predefined by the system, the first transmission can be canceled; otherwise, the first transmission cannot be canceled. It is to be noted that canceling the first transmission refers to canceling all of the time domain resources for the first transmission.

2. Whether to receive the first transmission is determined according to a redundancy version of a current first transmission and a specific redundancy version predefined by the system.

In the embodiment, the system may predefine or the base station may semi-statically configure the RV and may also directly specify that only the first transmission of a specific RV is received. Thus, when the RV of the current first transmission is the RV predefined by the system, the first transmission can be canceled; otherwise, the first transmission cannot be canceled. It is to be noted that canceling the first transmission refers to canceling all of the time domain resources for the first transmission.

It is to be understood that in the embodiment, the corresponding transmission is canceled when the corresponding time domain resources are canceled. For example, when the time domain resources corresponding to the first transmission are canceled, the first transmission is not received; when the time domain resources corresponding to the second transmission are canceled, the second transmission is not sent.

According to the transmission determination apparatus provided in the embodiments of the present disclosure, whether to receive a first transmission is determined according to first information, and/or whether to send a second transmission is determined according to first information, so that the first transmission is received or the second transmission is sent at one time moment; (where the first information includes at least one of the following pieces of information: whether time domain resources for the first transmission overlap time domain resources for the second transmission, a sequence relationship between a time domain starting resource for the first transmission and a time domain starting resource for the second transmission, first indication signaling, or a size of overlapping time domain resources for the first transmission and the second transmission; the first transmission includes a transmission scheduled by DCI, and the second transmission includes a transmission configured by higher-layer signaling). In this manner, it is ensured that a terminal and/or a base station transmit at most one transmission at one time moment, avoiding the time domain conflict caused by overlapping of time domain resources for a transmission scheduled by DCI and a transmission configured by higher-layer signaling, and thus avoiding the problem of not knowing which transmission to transmit.

Embodiment Fifteen

Figure 15:
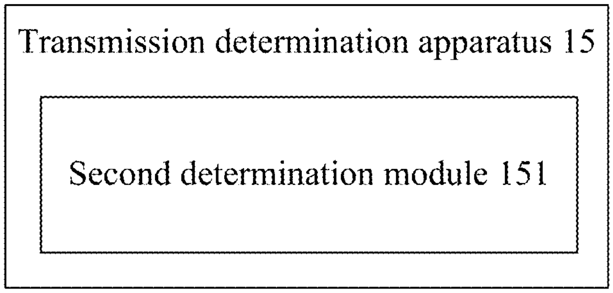
FIG. 15 is a structure diagram of a transmission determination apparatus according to embodiment fifteen of the present disclosure.

The embodiment provides a transmission determination apparatus. It is to be noted that in the embodiment, the transmission determination apparatus may be applied to a terminal or a base station. Referring to FIG. 15, FIG. 15 is a transmission determination apparatus 15 provided in the embodiment. The apparatus includes a second determination module 151. The second determination module 151 is configured to determine, according to first information, whether to send a first transmission, and/or determine, according to first information, whether to receive a second transmission, so that the first transmission is sent or the second transmission is received at one time moment.

It is to be noted that the first information in the embodiment includes at least one of the following pieces of information:

- whether time domain resources for the first transmission overlap time domain resources for the second transmission;
- a sequence relationship between a time domain starting resource for the first transmission and a time domain starting resource for the second transmission;
- first indication signaling; or
- a size of overlapping time domain resources for the first transmission and the second transmission.

It is to be noted that the first transmission in the embodiment includes a transmission scheduled by DCI, and the second transmission includes a transmission configured by higher-layer signaling. Specifically, the first transmission may be a transmission scheduled by DCI, and the second transmission may be a transmission configured by higher-layer signaling.

It is to be further noted that the transmission in the embodiment may be an uplink channel or signal transmission or a downlink channel or signal transmission.

It is to be understood that corresponding time domain resources are configured for a transmission to ensure that the transmission can be sent or received on the corresponding time domain resources.

However, it is to be noted that sending the first transmission in the embodiment includes sending the first transmission on part of the time domain resources for the first transmission or sending the first transmission on all of the time domain resources for the first transmission. That is, the first transmission may be sent on all of the time domain resources allocated to the first transmission, or the first transmission may be sent on a certain part of the time domain resources allocated to the first transmission. If the first transmission is sent on the certain part of the time domain resources, the unavailable time domain resources need to be subjected to rate matching when the first transmission is sent.

Similarly, receiving the second transmission in the embodiment includes receiving the second transmission on part of the time domain resources for the second transmission or receiving the second transmission on all of the time domain resources for the second transmission. That is, the second transmission may be received on all of the time domain resources allocated to the second transmission, or the second transmission may be received on a certain part of the time domain resources allocated to the second transmission. If the second transmission is received on the certain part of the time domain resources, the unavailable time domain resources need to be subjected to rate matching when the second transmission is received.

It is to be noted that, in the embodiment, both, one, or neither of the time domain starting resource for the first transmission and the time domain starting resource for the second transmission may fall within a first time period.

It is to be noted that the first time period in the embodiment is a time period with a duration of t starting from an end time of downlink control information scheduling the first transmission. In an implementation of the embodiment, the first time period may be the processing delay of receiving an uplink channel or signal.

In the embodiment, a first threshold may also be predefined by a system or semi-statically configured for a terminal by a base station. In this manner, in a case where the first information includes the size of the overlapping time domain resources for the first transmission and the second transmission, it is determined to send the first transmission when all or part of the overlapping time domain resources for the first transmission and the second transmission are less than or equal to the first threshold, or it is determined not to send the first transmission when all or part of the overlapping time domain resources for the first transmission and the second transmission are greater than the first threshold.

It is to be noted that the step in which it is determined to send the first transmission when part of the overlapping time domain resources for the first transmission and the second transmission are less than or equal to the first threshold, or it is determined not to send the first transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to send the first transmission when the one portion that falls within the first time period is less than or equal to the first threshold, or it is determined not to send the first transmission when the one portion that falls within the first time period is greater than the first threshold; or the other portion that falls outside the first time period is compared with the first threshold, and it is determined to send the first transmission when the other portion that falls outside the first time period is less than or equal to the first threshold, or it is determined not to send the first transmission when the other portion that falls outside the first time period is greater than the first threshold.

Similarly, for the second transmission in the embodiment, a second threshold predefined by the system or semi-statically configured by the base station for the terminal may also be predefined or semi-statically configured on the terminal and/or the base station in advance. In this manner, in a case where the first information includes the size of the overlapping time domain resources for the first transmission and the second transmission, it is determined to receive the second transmission when all or part of the overlapping time domain resources for the first transmission and the second transmission are less than or equal to the second threshold, or it is determined not to receive the second transmission when all or part of the overlapping time domain resources for the second transmission and the second transmission are greater than the first threshold.

It is to be noted that the step in which it is determined to receive the second transmission when part of the overlapping time domain resources for the first transmission and the second transmission are less than or equal to the first threshold, or it is determined not to receive the second transmission when all or part of the overlapping time domain resources for the first transmission and the second transmission are greater than the first threshold may specifically be as follows: when one portion of the part of the overlapping time domain resources for the first transmission and the second transmission fall within the first time period and the other portion falls outside the first time period, the one portion that falls within the first time period is compared with the first threshold, and it is determined to receive the second transmission when the one portion that falls within the first time period is less than or equal to the first threshold, or it is determined not to receive the second transmission when the one portion that falls within the first time period is greater than the first threshold; or the other portion that falls outside the first time period is compared with the first threshold, and it is determined to receive the second transmission when the other portion that falls outside the first time period is less than or equal to the first threshold, or it is determined not to receive the second transmission when the other portion that falls outside the first time period is greater than the first threshold.

It is to be noted that the first threshold and the second threshold configured in the embodiment may be the same or different. Specially, when the configured first threshold and the configured second threshold are the same, only one threshold may be required in the terminal and/or the base station to represent both the first threshold and the second threshold.

It is specially to be noted that in the embodiment, when it is determined, according to the first information, to send the first transmission, if the first transmission is sent on part of the time domain resources for the first transmission, rate matching may also be performed on the part of the time domain resources for the first transmission that are not used for sending the first transmission when the first transmission is sent.

Similarly, in the embodiment, when it is determined, according to the first information, to receive the second transmission, if the second transmission is received on part of the time domain resources for the second transmission, rate matching may also be performed on the part of the time domain resources for the second transmission that are not used for receiving the second transmission when the second transmission is received.

In the embodiment, in a case where the first information includes whether the time domain resources for the first transmission overlap the time domain resources for the second transmission and the sequence relationship between the time domain starting resource for the first transmission and the time domain starting resource for the second transmission, in response to the time domain resources for the first transmission overlapping the time domain resources for the second transmission, and in response to the time domain starting resource for the first transmission being before the time domain starting resource for the second transmission within a first time period, the first transmission may be sent on the time domain resources for the first transmission, and the reception of the second transmission on part or all of the time domain resources for the second transmission is canceled.

In the embodiment, in a case where the first information includes whether the time domain resources for the first transmission overlap the time domain resources for the second transmission, the step of determining, according to the first information, whether to send the first transmission, and determining, according to the first information, whether to receive the second transmission may be as described below.

In response to the time domain resources for the first transmission overlapping the time domain resources for the second transmission after the first time period, the second transmission is received on part of the time domain resources for the second transmission before the time domain starting resource for the first transmission, and the first transmission is sent on all of the time domain resources corresponding to the first transmission.

In the embodiment, in a case where the first information includes whether the time domain resources for the first transmission overlap the time domain resources for the second transmission, the step of determining, according to the first information, whether to send the first transmission may be as described below.

In response to the time domain resources for the first transmission overlapping the time domain resources for the second transmission, and in a case where the time domain starting resource for the second transmission is earlier than the time domain starting resource for the first transmission, the first transmission is sent on part of the time domain resources for the first transmission, or the first transmission is not sent.

Specifically, the step of sending the first transmission on the part of the time domain resources for the first transmission may be as described below.

The first transmission is sent on time domain resources for the first transmission after the first time period, or the first transmission is sent on time domain resources for the first transmission after an end of the time domain resources for the second transmission.

In the embodiment, in response to the time domain resources for the first transmission overlapping the time domain resources for the second transmission, and in the case where the time domain starting resource for the second transmission is earlier than the time domain starting resource for the first transmission, it is may be specifically determined whether to send the first transmission on the part of the time domain resources for the first transmission or not to send the first transmission according to the number of symbols included in time domain resources for the first transmission after the first time period and/or a proportion of time domain resources for the first transmission after the first time period among all of the time domain resources corresponding to the first transmission.

Specifically, a number of symbols threshold and/or a proportion threshold is predefined by the system or semi-statically configured by the base station.

Thus, in a case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission is sent on the part of the time domain resources for the first transmission; otherwise, the first transmission is not sent.

For example, sending the first transmission on the part of the time domain resources for the first transmission is sending the first transmission on time domain resources for the first transmission after the first time period; then, in the case where the number of symbols included in the time domain resources for the first transmission after the first time period is greater than or equal to the number of symbols threshold and/or the proportion of the time domain resources for the first transmission after the first time period among the all of the time domain resources for the first transmission is greater than or equal to the proportion threshold, the first transmission may be sent on the time domain resources for the first transmission after the first time period, and otherwise, the first transmission is not sent.

In an implementation of the embodiment, in a case where the first information includes whether the time domain resources for the first transmission overlap the time domain resources for the second transmission, the step of determining, according to the first information, whether to receive the second transmission may be as follows: in response to the time domain resources for the first transmission overlapping the time domain resources for the second transmission, and in a case where the time domain starting resource for the first transmission is before the time domain starting resource for the second transmission, the second transmission is received on part of the time domain resources for the second transmission, or the second transmission is not received.

In an implementation of the embodiment, in a case where the first information includes whether the time domain resources for the first transmission overlap the time domain resources for the second transmission, the step of determining, according to the first information, whether to send the first transmission may be as follows: in response to the time domain resources for the first transmission overlapping the time domain resources for the second transmission, and in a case where the time domain starting resource for the first transmission is before the time domain starting resource for the second transmission, the first transmission is sent on part of the time domain resources for the first transmission, or the first transmission is not sent.

Sending the first transmission on part of the time domain resources for the first transmission may specifically be sending the first transmission on part of the time domain resources for the first transmission after the first time period.

In the embodiment, the first indication signaling is signaling scheduling the first transmission and/or semi-static configuration signaling.

In a case where the first indication signaling is the signaling scheduling the first transmission, whether to send the first transmission is determined according to the first indication signaling in at least one of the included manners described below.

1. Whether to send the first transmission is determined according to a priority indication domain in the first indication signaling.

In the embodiment, a "priority indication" field may be added to the PDCCH DCI and indicates whether a channel or signal currently scheduled by the DCI can be canceled. If the domain indicates "Yes", the channel or signal currently scheduled by the DCI can be canceled; if the domain indicates "No", the channel or signal currently scheduled by the DCI cannot be canceled.

2. Whether to send the first transmission is determined according to a DCI format type for receiving the first indication signaling.

In the embodiment, a DCI format type corresponding to the PDCCH DCI may be used for indication. If the corresponding DCI format type corresponds to high-priority traffic, the channel or signal currently scheduled by the DCI cannot be canceled; if the corresponding DCI format type does not correspond to high-priority traffic, the channel or signal currently scheduled by the DCI can be canceled. For example, high-priority traffic corresponds to compact DCI format or DCI format0_0 or DCI format1_0, and low-priority traffic corresponds to non-compact DCI format or DCI format0_1 or DCI format1_1.

3. Whether to send the first transmission is determined according to an RNTI type for blindly detecting the first indication signaling.

In the embodiment, a scrambling RNTI type corresponding to the PDCCH DCI may be used for indication. If a first RNTI type is used for scrambling a cyclic redundancy check (CRC) check bit of the PDCCH DCI, the channel or signal currently scheduled by the DCI cannot be canceled; if other RNTIs other than the first RNTI type are used for scrambling the CRC check bit of the PDCCH DCI, the channel or signal currently scheduled by the DCI can be canceled.

In a case where the first indication signaling is the semi-static configuration signaling, whether to send the first transmission is determined according to the first indication signaling in at least one of the included manners described below.

1. Whether to send the first transmission is determined according to a repetition factor indicated in the first indication signaling and a repetition serial number of a current first transmission.

In the embodiment, the repetition factor may be predefined by the system or semi-statically configured by the base station. The first indication signaling may specify that only the first transmission of a specific repetition serial number can be canceled. For example, if the repetition factor is 4, the current first transmission needs to be sent 4 times, and then it may be set that one or several of these 4 times can be canceled. For example, the repetition factor is configured by higher-layer signaling to be m, the current first transmission is the n-th first transmission, and n is less than or equal to m, and then whether the n-th first transmission can be sent is determined according to which of the m transmissions can be canceled and which cannot be canceled predefined by the system or semi-statically configured by the base station. It is to be noted that canceling the first transmission refers to canceling all of the time domain resources for the first transmission.

2. Whether to send the first transmission is determined according to a first transmission redundancy version determined by the first indication signaling and a redundancy version (RV) used in a current first transmission.

In the embodiment, a RV number for each first transmission may be predefined by the system or semi-statically configured by the base station. The first indication signaling may specify that only the first transmission of a specific RV number can be canceled. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission can be canceled when RV is 2 and 4, so only the second and fourth first transmissions can be canceled among these four first transmissions. It is to be noted that canceling the first transmission refers to canceling all of the time domain resources for the first transmission. In the embodiment, a RV number for each first transmission may be predefined by the system or semi-statically configured by the base station. The first indication signaling may specify that only the first transmission of a specific RV number is sent. For example, the RV of the first first transmission is configured to be 0, the RV of the second first transmission is configured to be 2, the RV of the third first transmission is configured to be 3, and the RV of the fourth first transmission is configured to be 1 by higher-layer signaling; the first indication signaling may specify that the first transmission is sent when RV is 0 and 1, so only the first and fourth first transmissions are sent among these four first transmissions.

The current first transmission is the n-th first transmission, n is less than or equal to m, and then whether the n-th first transmission can be sent is determined according to which of the m transmissions can be canceled and which cannot be canceled predefined by the system or semi-statically configured by the base station.

In addition, in the embodiment, determining, according to the first indication signaling, whether to send the first transmission may further be: determining, according to a rule predefined by the system, whether to send the first transmission.

In the embodiment, whether to send the first transmission is determined according to the rule predefined by the system in at least one of the included manners described below.

1. Whether to send the first transmission is determined according to a repetition serial number of a current first transmission and a specific repetition serial number predefined by the system.

In the embodiment, the system may predefine or the base station may semi-statically configure the repetition factor and may also directly specify that only the first transmission of a specific repetition serial number can be sent. Thus, when the repetition serial number of the current first transmission is the specific repetition serial number predefined by the system, the first transmission can be canceled; otherwise, the first transmission cannot be canceled. It is to be noted that canceling the first transmission refers to canceling all of the time domain resources for the first transmission.

2. Whether to send the first transmission is determined according to a redundancy version of a current first transmission and a specific redundancy version predefined by the system.

In the embodiment, the system may predefine or the base station may semi-statically configure the RV and may also directly specify that only the first transmission of a specific RV is sent. Thus, when the RV of the current first transmission is the RV predefined by the system, the first transmission can be canceled; otherwise, the first transmission cannot be canceled. It is to be noted that canceling the first transmission refers to canceling all of the time domain resources for the first transmission.

It is to be understood that in the embodiment, the corresponding transmission is canceled when the corresponding time domain resources are canceled. For example, when the time domain resources corresponding to the first transmission are canceled, the first transmission is not sent; when the time domain resources corresponding to the second transmission are canceled, the second transmission is not received.

According to the transmission determination apparatus provided in the embodiments of the present disclosure, whether to send a first transmission is determined according to first information, and/or whether to receive a second transmission is determined according to first information, so that the first transmission is sent or the second transmission is received at one time moment; (where the first information includes at least one of the following pieces of information: whether time domain resources for the first transmission overlap time domain resources for the second transmission, a sequence relationship between a time domain starting resource for the first transmission and a time domain starting resource for the second transmission, first indication signaling, or a size of overlapping time domain resources for the first transmission and the second transmission; the first transmission includes a transmission scheduled by DCI, and the second transmission includes a transmission configured by higher-layer signaling). In this manner, it is ensured that a terminal and/or a base station transmit at most one transmission at one time moment, avoiding the time domain conflict caused by overlapping of time domain resources for a transmission scheduled by DCI and a transmission configured by higher-layer signaling, and thus avoiding the problem of not knowing which transmission to transmit.

Embodiment Sixteen

Figure 16:
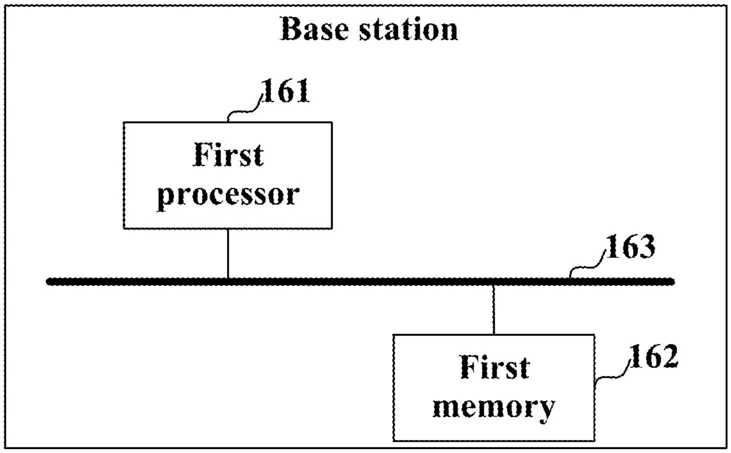
FIG. 16 is a structure diagram of a base station according to embodiment sixteen of the present disclosure.

The embodiment provides a base station as shown in FIG. 16. The base station includes a first processor 161, a first memory 162, and a first communication bus 163.

The first communication bus 163 is configured to implement connection and communication between the first processor 161 and the first memory 162.

The first processor 161 is configured to execute one or more first programs stored in the first memory 162 to implement steps of the transmission determination method as described in embodiment one; and/or the first processor 161 is configured to execute one or more second programs stored in the first memory 162 to implement steps of the transmission determination method as described in embodiment two.

Figure 17:
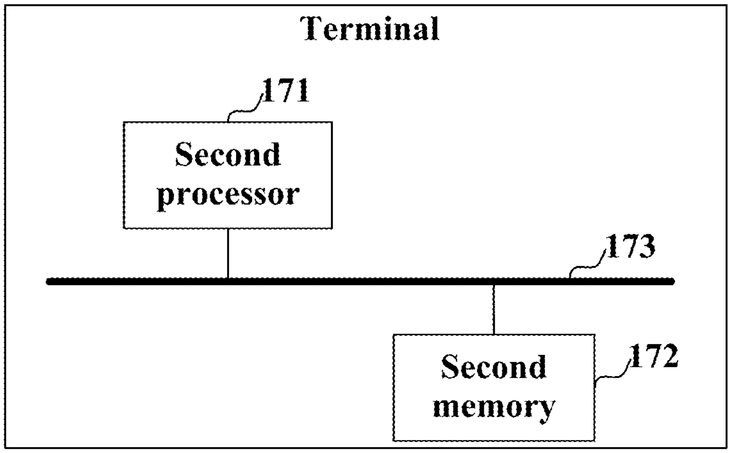
FIG. 17 is a structure diagram of a terminal according to embodiment sixteen of the present disclosure.

The embodiment provides a terminal. Referring to FIG. 17, the terminal includes a second processor 171, a second memory 172, and a second communication bus 173.

The second communication bus 173 is configured to implement connection and communication between the second processor 171 and the second memory 172.

The second processor 171 is configured to execute one or more third programs stored in the second memory 172 to implement steps of the transmission determination method as described in embodiment one; and/or the second processor 171 is configured to execute one or more fourth programs stored in the second memory 172 to implement steps of the transmission determination method as described in embodiment two.

The embodiment further provides a computer-readable storage medium. The computer-readable storage medium includes volatile or nonvolatile and removable or non-removable media implemented in any method or technology for the storage of information (such as computer-readable instructions, data structures, computer program modules, or other data). The computer-readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital versatile disc (DVD) or other optical disc storage, a magnetic cassette, a magnetic tape, magnetic disk storage, or other magnetic storage apparatuses, or any other medium that may be used for storing desired information and accessed by a computer.

The embodiment provides a computer-readable storage medium storing computer-executable instructions executable by one or more processors to implement the steps of the transmission determination method described in any one or more of embodiments one to thirteen. Repetition is not made here.

In the present application, if not in collision, the features of the various embodiments may be combined with each other and used in the same embodiment. Each embodiment is merely an implementation of the present application.

In addition, it can be understood by those skilled in the art that functional modules/units in all or part of the steps of the method, the system, and the apparatus disclosed above may be implemented as software (which may be implemented by computer program codes executable by a computing apparatus), firmware, hardware and appropriate combinations thereof. In the hardware implementation, the division of the functional modules/units mentioned in the above description may not correspond to the division of physical components. For example, one physical component may have multiple functions, or one function or step may be performed jointly by several physical components. Some or all physical components may be implemented as software executable by a processor such as a central processor, a digital signal processor or a microcontroller, may be implemented as hardware, or may be implemented as integrated circuits such as application-specific integrated circuits.

In addition, as is known to those of ordinary skill in the art, a communication medium generally includes computer-readable instructions, data structures, computer program modules, or other data in modulated data signals such as carriers or other transmission mechanisms, and the communication medium may include any information delivery medium. Thus, the present disclosure is not limited to any specific combination of hardware and software.

The preceding content is a further detailed description of the present disclosure in conjunction with the embodiments, and the implementation of the present disclosure is not limited to the description.

What is claimed is:

1. A method for determining paging monitoring occasion by a terminal, comprising:

acquiring semi-static frame structure configuration information;

acquiring synchronization signal block (SSB) configuration information;

acquiring paging physical downlink control channel (PDCCH) configuration information; and determining paging occasion;

wherein the determined paging occasion refers to a paging PDCCH occasion that is not in conflict with an uplink resource configured in the semi-static frame structure configuration information;

wherein a number of determined paging occasions is equal to a number of actually transmitted SSBs and each of the determined paging occasions is in one-to-one correspondence with each of the actually transmitted SSBs.

2. The method of claim 1, the semi-static frame structure configuration information comprises a frame structure configured by high-layer signaling tdd-UL-DL-ConfigCommon and/or tdd-UL-DL-ConfigDedicated.

3. The method of claim 1, wherein the SSB configuration information is used to configure the actually transmitted SSBs.

4. The method of claim 1, wherein the paging PDCCH information comprises paging PDCCH search space configuration.

5. An determining paging monitoring occasion, comprising: one or more processors; and one or more memories storing a computer program that when executed by the one or more processors cause the one or more processors to perform operations, the operations comprising:

acquiring semi-static frame structure configuration information;

acquiring synchronization signal block (SSB) configuration information;

acquiring paging physical downlink control channel (PDCCH) configuration information; and determining paging occasion;

wherein the determined paging occasion refers to a paging PDCCH occasion that is not in conflict with an uplink resource configured in the semi-static frame structure configuration information;

wherein a number of determined paging occasions is equal to a number of actually transmitted SSBs and each of the determined paging occasions is in one-to-one correspondence with each of the actually transmitted SSBs based on position information of the actually transmitted SSBs.

6. A non-transitory computer-readable storage medium, which is configured to store one or more computer programs executable by one or more processors to perform operations, the operations comprising:

acquiring semi-static frame structure configuration information;

acquiring synchronization signal block (SSB) configuration information;

acquiring paging physical downlink control channel (PDCCH) configuration information; and determining paging occasion;

wherein the determined paging occasion refers to a paging PDCCH occasion that is not in conflict with an uplink resource configured in the semi-static frame structure configuration information;

wherein a number of determined paging occasions is equal to a number of actually transmitted SSBs and each of the determined paging occasions is in one-to-one correspondence with each of the actually transmitted SSBs based on position information of the actually transmitted SSBs.

* * * * *